United States Patent
Shan

(10) Patent No.: US 12,075,516 B2
(45) Date of Patent: Aug. 27, 2024

(54) RESOURCE MANAGEMENT METHOD AND APPARATUS

(71) Applicant: Huawei Technologies Co., Ltd., Shenzhen (CN)

(72) Inventor: Baokun Shan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 390 days.

(21) Appl. No.: 17/390,378

(22) Filed: Jul. 30, 2021

(65) Prior Publication Data
US 2021/0360738 A1 Nov. 18, 2021

Related U.S. Application Data

(63) Continuation of application No. PCT/CN2019/074466, filed on Feb. 1, 2019.

(51) Int. Cl.
*H04W 76/36* (2018.01)
*H04W 68/00* (2009.01)
(Continued)

(52) U.S. Cl.
CPC ......... *H04W 76/36* (2018.02); *H04W 68/005* (2013.01); *H04W 72/0466* (2013.01); *H04W 72/23* (2023.01)

(58) Field of Classification Search
CPC ............... H04W 76/36; H04W 68/005; H04W 72/0466; H04W 72/23; H04W 68/00;
(Continued)

(56) References Cited

U.S. PATENT DOCUMENTS 11,051,362 B2 * 6/2021 Wang .................... H04W 80/02
11,128,359 B2 * 9/2021 Zhou .................... H04W 72/23
(Continued)

FOREIGN PATENT DOCUMENTS

| CN | 109076506 B | 4/2021 |
| WO | 2018084115 A1 | 5/2018 |
| WO | 2018212628 A1 | 11/2018 |

OTHER PUBLICATIONS

LG Electronics, "Discussion on preconfigured UL resources in NB-IoT", 3GPP TSG RAN WG1 Meeting #95, Spokane, USA, R1-1812536, XP051554480, total 9 pages, 3rd Generation Partnership Project, Valbonne, France (Nov. 12-16, 2018).
(Continued)

*Primary Examiner* — Brian T O Connor
(74) *Attorney, Agent, or Firm* — Leydig, Voit & Mayer, Ltd.

(57) ABSTRACT

This application relates to a resource management method and an apparatus. The resource management method includes: A network device determines to release or disable one or more uplink resources, where the uplink resources are used to receive uplink data from a terminal device in idle mode. The network device sends first information, where the first information is used to indicate to release or disable a part or all of the one or more uplink resources. The network device may implement relatively flexible management on the uplink resources that are configured for the terminal device and that are used for transmission by the terminal device in idle mode, so that the network device may also schedule the uplink resources when needing to schedule uplink resources.

14 Claims, 10 Drawing Sheets

(51) Int. Cl.
*H04W 72/044* (2023.01)
*H04W 72/23* (2023.01)

(58) Field of Classification Search
CPC ............. H04W 72/04; H04W 72/0446; H04W 52/0216; H04W 52/0229; H04L 5/0044; H04W 72/51; H04W 72/52; H04W 76/27; H04W 76/30; Y02D 30/70
See application file for complete search history.

(56) References Cited

U.S. PATENT DOCUMENTS

| | | | |
|---|---|---|---|
| 11,510,240 B2 * | 11/2022 | Lee | H04W 74/02 |
| 11,616,528 B2 * | 3/2023 | Rico Alvarino | H04L 5/0044 |
| | | | 370/329 |
| 11,696,363 B2 * | 7/2023 | Zheng | H04W 76/34 |
| | | | 370/329 |
| 11,792,876 B2 * | 10/2023 | Sha | H04W 76/27 |
| | | | 370/311 |
| 2018/0167918 A1 | 6/2018 | Ishii | |
| 2019/0037447 A1 | 1/2019 | Lee et al. | |
| 2021/0298108 A1 * | 9/2021 | Wu | H04W 56/0045 |
| 2021/0345344 A1 * | 11/2021 | Sha | H04W 72/1273 |
| 2021/0345372 A1 * | 11/2021 | Li | H04W 72/27 |
| 2021/0400567 A1 * | 12/2021 | Sha | H04W 76/27 |
| 2022/0038997 A1 * | 2/2022 | Höglund | H04W 48/06 |
| 2022/0104225 A1 * | 3/2022 | Yan | H04W 72/1268 |
| 2022/0225401 A1 * | 7/2022 | Ljung | H04W 72/1273 |

OTHER PUBLICATIONS

"Discussion on preconfigured UL resources in NB-IoT," 3GPP TSG RAN WG1 Meeting #94, R1-1812536, Spokane, USA, Total 9 pages, 3rd Generation Partnership Project, Valbonne, France (Nov. 12-16, 2018).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.9.0, pp. 1-773, 3rd Generation Partnership Project, Valbonne, France (Dec. 2018).

"UL transmission in preconfigured resources for eMTC," 3GPP TSG RAN WG1 Meeting #95, R1-1812455, Spokane, USA, pp. 1-7, 3rd Generation Partnership Project, Valbonne, France (Nov. 12-16, 2018).

"Discussion on preconfigured UL resources in NB-IoT," 3GPP TSG RAN WG1 Meeting #94bis, R1-1810241, Chengdu, China, Total 7 pages, 3rd Generation Partnership Project, Valbonne, France (Oct. 8-12, 2018).

"Further topics for transmission in preconfigured UL resources," 3GPP TSG RAN WG1 Meeting #95, Spokane, USA, R1-1813762, Total 14 pages, 3rd Generation Partnership Project, Valbonne, France (Nov. 12-16, 2018).

* cited by examiner

RESOURCE MANAGEMENT METHOD AND APPARATUS

CROSS-REFERENCE TO RELATED APPLICATIONS

This application is a continuation of International Application No. PCT/CN2019/074466, filed on Feb. 1, 2019, the disclosure of which is hereby incorporated by reference in its entirety.

TECHNICAL FIELD

This application relates to the field of mobile communication technologies, and in particular, to a resource management method and an apparatus.

BACKGROUND

Mobile communication has greatly changed people's lives, but a pursuit of mobile communication with higher performance has never stopped. A 5G system emerges to cope with future explosive growth of mobile data traffic, massive device connections, and various emerging new services and application scenarios. As a part of 5G, an internet of things has a rapidly increasing market demand. A forecast shows that a quantity of connections to the 5G internet of things will reach 18 billion by the year 2022.

Currently, a solution for a feature of the internet of things has been proposed in a 3rd generation partnership project (3GPP) standard based on a cellular network. For example, a narrowband internet of things (NB-IoT) network and an enhanced machine type communication (eMTC) network may carry an internet of things service by using a feature of a narrowband technology. The NB-IoT network uses a new air interface technology independent of an existing cellular network, a terminal device has lower costs, and a lower rate and lower mobility are supported. As a sub-characteristic of the existing cellular network, for a feature of the internet of things, the eMTC network may support the internet of things service in a long term evolution (LTE) network.

Both NB-IoT and eMTC have been commercially used on large scale since the Release (Rel)-13, and the standard continuously evolve from the Rel-14 and the Rel-15. The Rel-16 is being discussed in the 3GPP standard. In each release, a new feature is added to the standard to continuously optimize system performance. For example, for a feature that a terminal device needs to establish a radio resource control (RRC) connection even if the terminal device sends a small amount of data, to reduce steps such as connection or release required by the terminal device to establish the RRC connection, and reduce data transmission power consumption, an early data transmission (EDT) mechanism is introduced in the Rel-15. In the EDT mechanism, the terminal device is allowed to transmit a small amount of data by using a message (Msg3) in a random access procedure, and ends a transmission procedure after Msg4 without needing to enter RRC connected mode.

However, even if the EDT mechanism is available, the Msg3 can carry a very small amount of data. Therefore, if the terminal device needs to transmit a relatively large amount of data, the EDT mechanism still cannot meet a requirement that the terminal device in RRC idle mode transmits the data. Therefore, in current discussion, uplink resources may be further preconfigured for a terminal device when the terminal device is in connected mode, and the preconfigured uplink resources are used by the terminal device to transmit uplink data in idle mode. However, because the terminal device does not monitor any unicast signaling in idle mode, a base station cannot perform other scheduling on the preconfigured uplink resources. In other words, even if the terminal device for which the uplink resources are preconfigured does not use these uplink resources in idle mode, these uplink resources cannot be used by another terminal device. For example, when services of the base station are relatively busy, some services may lack uplink resources, but uplink resources preconfigured for some terminal devices may be in idle mode and cannot be used. It is clear that, because the preconfigured uplink resources are not effectively managed, scheduling of the uplink resources by the base station is out of control. Consequently, a communication process under coverage of the base station may be faulty. For example, for a service that lacks an uplink resource, a transmission failure may occur, or congestion may occur because a relatively large amount of uplink data needs to be sent by using a relatively small quantity of uplink resources.

SUMMARY

Embodiments of this application provide a resource management method and an apparatus, so that a network device can perform relatively proper scheduling and management on an uplink resource.

According to a first aspect, a first resource management method is provided. The method includes: A network device determines to release or disable one or more uplink resources, where the uplink resources are used to receive uplink data from a terminal device in idle mode. The network device sends first information, where the first information is used to indicate to release or disable a part or all of the one or more uplink resources.

The method may be performed by a first communication apparatus. The first communication apparatus may be a communication device or a communication apparatus (for example, a chip system) that can support the communication device in implementing a required function of the method. For example, the communication device may be a network device. Herein, an example in which the first communication apparatus is a network device is used.

In this embodiment of this application, uplink resources used by the terminal device to send uplink data in idle mode may be allocated to the terminal device, so that the terminal device may send the uplink data in idle mode by using the allocated uplink resources. Compared with uplink data sent in an EDT manner, an amount of the uplink data that can be sent by using these uplink resources may be relatively large, so that a data transmission requirement of the terminal device in RRC idle mode is met. In addition, for example, when network load is relatively heavy, the network device may determine to release or disable at least one uplink resource. In this case, the network device may broadcast the first information, and indicate, by using the first information, to release or disable the at least one uplink resource. Therefore, after receiving the first information, the terminal device may determine to release or disable a corresponding uplink resource according to an indication of the first information, so that the network device performs other scheduling on the uplink resource. It can be learned that, according to the technical solution provided in this embodiment of this application, the network device may implement relatively flexible management on the uplink resources that are configured for the terminal device and that are used for transmission by the terminal device in idle mode, so that the network device may also schedule the uplink resources when needing to schedule uplink resources. In this way, reasonableness of resource management by the network device is improved, flexibility of resource scheduling by the network device is improved, normal communication process covered by the network device can be ensured as much as possible, a probability of a problem such as a service transmission failure or congestion is reduced, and resource utilization is also improved.

With reference to the first aspect, in an embodiment of the first aspect, the one or more uplink resources include all uplink resources that are configured by the network device and that are used by the terminal device to perform uplink transmission in idle mode.

The network device may indicate to release or disable a relatively large quantity of uplink resources, so that load of the network device can be greatly reduced. In addition, the release or disabling can be implemented by using only the first information, helping reduce signaling overheads.

With reference to the first aspect, in an embodiment of the first aspect, the first information includes at least one first index, used to indicate to release an uplink resource that is corresponding to the at least one first index and that is in the one or more uplink resources; or the first information includes a first condition, used to indicate to release an uplink resource that meets the first condition and that is in the one or more uplink resources.

In addition to configuring a first uplink resource for a first terminal device, the network device may further configure a first index for the configured first uplink resource. For example, one uplink resource is corresponding to one first index. If the first uplink resource includes a plurality of uplink resources, the first uplink resource may be corresponding to a plurality of first indexes. The first index may be used to indicate to release a corresponding uplink resource. After configuring the first index for the uplink resource, if the network device needs to indicate to release the corresponding uplink resource, the network device needs to include only the first index corresponding to the uplink resource that needs to be released in the first information. The terminal device may determine, based on the first index carried in the first information, whether to release the uplink resource configured by the network device for the terminal device. This indication manner is relatively clear. In addition, a same first index may alternatively be set for a plurality of uplink resources. In this case, the network device may indicate, by including one first index in the first information, to release the plurality of uplink resources, thereby reducing signaling overheads of the first information.

Alternatively, the first information may include a first condition. For example, different uplink resources may meet different conditions. In this case, the network device may indicate to release an uplink resource that meets a corresponding condition. The first information directly carries the first condition, and the terminal device may determine, based on the first condition, whether to release the uplink resource configured by the network device for the terminal device. This indication manner is also relatively clear. In addition, the network device needs to include only the first condition, and the terminal device may perform determining by itself. The network device does not need to determine, one by one, uplink resources configured for terminal devices meet the first condition, so that workload of the network device can be reduced.

With reference to the first aspect, in an embodiment of the first aspect, the first information includes at least one second index, used to indicate to disable an uplink resource that is corresponding to the at least one second index and that is in the one or more uplink resources; or the first information includes a second condition, used to indicate to disable an uplink resource that meets the second condition and that is in the one or more uplink resources.

In addition to configuring the first uplink resource for the first terminal device, the network device may further configure a second index for the configured first uplink resource. For example, one uplink resource is corresponding to one second index. If the first uplink resource includes a plurality of uplink resources, the first uplink resource may be corresponding to a plurality of second indexes. The second index may be used to indicate to disable a corresponding uplink resource. After configuring the second index for the uplink resource, if the network device needs to indicate to disable the corresponding uplink resource, the network device needs to include only the second index corresponding to the uplink resource that needs to be disabled in the first information. The terminal device may determine, based on the second index carried in the first information, whether to disable the uplink resource configured by the network device for the terminal device. This indication manner is relatively clear. In addition, a same second index may alternatively be set for a plurality of uplink resources. In this case, the network device may indicate, by including one second index in the first information, to release the plurality of uplink resources, thereby reducing signaling overheads of the first information.

Alternatively, the first information may include a second condition. For example, different uplink resources may meet different conditions. In this case, the network device may indicate to disable an uplink resource that meets a corresponding condition. The first information directly carries the second condition, and the terminal device may determine, based on the second condition, whether to disable the uplink resource configured by the network device for the terminal device. This indication manner is also relatively clear. In addition, the network device needs to include only the second condition, and the terminal device may perform determining by itself. The network device does not need to determine, one by one, uplink resources configured for terminal devices meet the second condition, so that workload of the network device can be reduced.

With reference to the first aspect, in an embodiment of the first aspect, the method further includes: The network device sends second information to the first terminal device, where the second information is used to configure the first uplink resource for the first terminal device, the second information is further used to configure a first index and/or a second index for the first uplink resource, the first index is used to indicate whether to release the first uplink resource, and the second index is used to indicate whether to disable the first uplink resource.

For example, while configuring the first uplink resource for the first terminal device, the network device may configure the first index and/or the second index for the first uplink resource. For example, if the network device configures the first uplink resource for the first terminal device by using the second information, the network device may further configure the first index and/or the second index for the first uplink resource by using the second information. Alternatively, the network device configures the uplink resource for the first terminal device and configures the first index and/or the second index for the first uplink resource by using different information. For example, if the network device configures the first uplink resource for the first terminal device by using the second information, the network device may further configure the first index and/or the second index for the first uplink resource by using third information. The second information and the third information may be carried in a same piece of signaling. The signaling is, for example, higher layer signaling, such as RRC signaling, or may be physical layer signaling, such as DCI. No specific limitation is imposed. Alternatively, the second information and the third information may be carried in different signaling, for example, carried in two pieces of RRC signaling, or the second information is carried in RRC signaling and the third information is carried in DCI. In addition, if the network device separately configures the first uplink resource for the first terminal device and configures the first index and/or the second index for the first uplink resource by using two pieces of signaling, the network device may send the two pieces of signaling at the same time, may first send signaling used to configure the first uplink resource for the terminal device, or may first send signaling for configuring the first index and/or the second index for the first uplink resource. Alternatively, if the network device needs to configure the first index and the second index for the first uplink resource, both the first index and the second index may be configured by using one piece of signaling, or the first index and the second index may be separately configured by using two pieces of signaling. No specific limitation is imposed.

With reference to the first aspect, in an embodiment of the first aspect, that the network device sends first information includes:
the network device sends a system message, where the system message includes the first information, and the system message is a SIB and/or a MIB; or
the network device sends the first information in a paging manner.

A manner in which the network device sends the first information is not limited in this embodiment of this application.

With reference to the first aspect, in an embodiment of the first aspect, that the network device sends the first information in a paging manner includes:
the network device sends DCI used to schedule a paging message, where the DCI includes the first information; or
after sending DCI used to schedule a paging message, the network device sends the paging message, where the paging message includes the first information.

This is an optional manner in which the network device sends the first information in the paging manner. The network device may send the first information by using the DCI, or may send the first information by using the paging message. No specific limitation is imposed.

With reference to the first aspect, in an embodiment of the first aspect, that the network device sends the first information in a paging manner includes:
the network device sends DCI scrambled by a first RNTI, where the DCI includes the first information, and the first RNTI is not a P-RNTI; or
after sending DCI scrambled by a first RNTI, the network device sends a PDSCH scheduled by the DCI, where the PDSCH includes the first information, and the first RNTI is not a P-RNTI.

This is another optional manner in which the network device sends the first information in the paging manner. In this manner, the DCI carrying the first information or the DCI used to schedule the PDSCH that carries the first information may be scrambled by the first RNTI, where the first RNTI is not a P-RNTI. The network device may still send, at a paging occasion, the DCI scrambled by the first RNTI, so that the terminal device in idle mode may receive the DCI scrambled by the first RNTI. After receiving the DCI scrambled by the first RNTI, the terminal device may determine, based on the first RNTI, that the DCI or the PDSCH scheduled by the DCI includes the first information, so that the terminal device may obtain the first information. The DCI carrying the first information is distinguished from common DCI used to schedule the paging message, helping the terminal device obtain different information based on different DCI.

According to a second aspect, a second resource management method is provided. The method includes: A first terminal device receives second information from a network device, where the second information is used to configure a first uplink resource for the first terminal device, and the first uplink resource is used by the first terminal device in idle mode to send uplink data to the network device. The first terminal device receives first information from the network device. The first terminal device determines, according to an indication of the first information, whether to release or disable the first uplink resource.

The method may be performed by a second communication apparatus. The second communication apparatus may be a communication device or a communication apparatus (for example, a chip system) that can support the communication device in implementing a required function of the method. For example, the communication device may be a terminal device. Herein, an example in which the second communication apparatus is a terminal device is used.

With reference to the second aspect, in an embodiment of the second aspect, the second information is further used to configure a first index and/or a second index for the first uplink resource, the first index is used to indicate whether to release the first uplink resource, and the second index is used to indicate whether to disable the first uplink resource.

With reference to the second aspect, in an embodiment of the second aspect, the first information is used to indicate to release or disable all uplink resources that are configured by the network device and that are used by the terminal device to perform uplink transmission in idle mode.

With reference to the second aspect, in an embodiment of the second aspect, that the first terminal device determines, according to an indication of the first information, whether to release the first uplink resource includes:
if the first information includes at least one first index, when the first terminal device determines that the first index corresponding to the first uplink resource belongs to the at least one first index, the first terminal device determines to release the first uplink resource; and when the first terminal device determines that the first index corresponding to the first uplink resource does not belong to the at least one first index, the first terminal device determines not to release the first uplink resource; or
if the first information includes a first condition, when the first terminal device determines that the first uplink resource meets the first condition, the first terminal device determines to release the first uplink resource; and when the first terminal device determines that the first uplink resource does not meet the first condition, the first terminal device determines not to release the first uplink resource.

With reference to the second aspect, in an embodiment of the second aspect, that the first terminal device determines, according to an indication of the first information, whether to disable the first uplink resource includes:

if the first information includes at least one second index, when the first terminal device determines that the second index corresponding to the first uplink resource belongs to the at least one second index, the first terminal device determines to disable the first uplink resource; and when the first terminal device determines that the second index corresponding to the first uplink resource does not belong to the at least one second index, the first terminal device determines not to disable the first uplink resource; or if the first information includes a second condition, when the first terminal device determines that the first uplink resource meets the second condition, the first terminal device determines to disable the first uplink resource; and when the first terminal device determines that the first uplink resource does not meet the second condition, the first terminal device determines not to disable the first uplink resource.

With reference to the second aspect, in an embodiment of the second aspect, that the first terminal device receives first information from the network device includes:

when the first terminal device has to-be-sent uplink data, the first terminal device receives a broadcast message from the network device, where the broadcast message includes the first information; or the first terminal device receives the first information in a paging manner.

With reference to the second aspect, in an embodiment of the second aspect, that the first terminal device receives the first information in a paging manner includes:

the first terminal device receives, at a paging occasion, DCI used to schedule a paging message, where the DCI includes the first information; or after receiving, at a paging occasion, DCI used to schedule a paging message, the first terminal device receives the paging message, where the paging message includes the first information.

With reference to the second aspect, in an embodiment of the second aspect, that the first terminal device receives the first information in a paging manner includes:

the first terminal device receives, at a paging occasion, DCI scrambled by a first RNTI, where the DCI includes the first information, and the first RNTI is not a P-RNTI; or after receiving, at a paging occasion, DCI scrambled by a first RNTI, the first terminal device receives a PDSCH scheduled by the DCI, where the PDSCH includes the first information, and the first RNTI is not a P-RNTI.

With reference to the second aspect, in an embodiment of the second aspect, the broadcast message is a SIB and/or a MIB.

With reference to the second aspect, in an embodiment of the second aspect, the method further includes:

the first terminal device releases or disables the first uplink resource according to an indication of the first information, to avoid sending the uplink data by using the first uplink resource; or the first terminal device skips releasing or disabling the first uplink resource according to an indication of the first information, and sends the uplink data by using the first uplink resource.

For technical effects brought by the second aspect or the possible implementations of the second aspect, refer to the descriptions of the technical effects brought by the first aspect or the implementations of the first aspect.

According to a third aspect, a first type of communication apparatus is provided. For example, the communication apparatus is the foregoing first communication apparatus. The communication apparatus is configured to perform the method according to any one of the first aspect or the possible implementations of the first aspect. Specifically, the communication apparatus may include modules configured to perform the method according to any one of the first aspect or the possible implementations of the first aspect, for example, include a processing module and a transceiver module that are coupled to each other. For example, the communication apparatus is a network device.

The processing module is configured to determine to release or disable one or more uplink resources, where the uplink resources are used to receive uplink data from a terminal device in idle mode.

The transceiver module is configured to send first information, where the first information is used to indicate to release or disable a part or all of the one or more uplink resources.

With reference to the third aspect, in an embodiment of the third aspect, the one or more uplink resources include all uplink resources that are configured by the network device and that are used by the terminal device to perform uplink transmission in idle mode.

With reference to the third aspect, in an embodiment of the third aspect, the first information includes at least one first index, used to indicate to release an uplink resource that is corresponding to the at least one first index and that is in the one or more uplink resources; or the first information includes a first condition, used to indicate to release an uplink resource that meets the first condition and that is in the one or more uplink resources.

With reference to the third aspect, in an embodiment of the third aspect, the first information includes at least one second index, used to indicate to disable an uplink resource that is corresponding to the at least one second index and that is in the one or more uplink resources; or the first information includes a second condition, used to indicate to disable an uplink resource that meets the second condition and that is in the one or more uplink resources.

With reference to the third aspect, in an embodiment of the third aspect, the transceiver module is further configured to send second information to a first terminal device, where the second information is used to configure a first uplink resource for the first terminal device, the second information is further used to configure a first index and/or a second index for the first uplink resource, the first index is used to indicate whether to release the first uplink resource, and the second index is used to indicate whether to disable the first uplink resource.

With reference to the third aspect, in an embodiment of the third aspect, the transceiver module is configured to send the first information in the following manner:

sending a system message, where the system message includes the first information, and the system message is a SIB and/or a MIB; or sending the first information in a paging manner.

With reference to the third aspect, in an embodiment of the third aspect, the transceiver module is configured to send the first information in a paging manner in the following manner:

sending, at a paging occasion, DCI used to schedule a paging message, where the DCI includes the first information; or after sending, at a paging occasion, DCI used to schedule a paging message, sending the paging message, where the paging message includes the first information.

With reference to the third aspect, in an embodiment of the third aspect, the transceiver module is configured to send the first information in a paging manner in the following manner:

sending, at a paging occasion, DCI scrambled by a first RNTI, where the DCI includes the first information, and the first RNTI is not a P-RNTI; or after sending, at a paging occasion, DCI scrambled by a first RNTI, sending a PDSCH scheduled by the DCI, where the PDSCH includes the first information, and the first RNTI is not a P-RNTI.

For technical effects brought by the third aspect or the possible implementations of the third aspect, refer to the descriptions of the technical effects brought by the first aspect or the implementations of the first aspect.

According to a fourth aspect, a second type of communication apparatus is provided. For example, the communication apparatus is the foregoing second communication apparatus. The communication apparatus is configured to perform the method according to any one of the second aspect or the possible implementations of the second aspect. Specifically, the communication apparatus may include modules configured to perform the method according to any one of the second aspect or the possible implementations of the second aspect, for example, include a processing module and a transceiver module that are coupled to each other. For example, the communication apparatus is a terminal device.

The transceiver module is further configured to receive second information from a network device, where the second information is used to configure a first uplink resource for the communication device, and the first uplink resource is used by the communication device in idle mode to send uplink data to the network device.

The transceiver module is further configured to receive first information from the network device.

The processing module is configured to determine, according to an indication of the first information, whether to release or disable the first uplink resource.

With reference to the fourth aspect, in an embodiment of the fourth aspect, the second information is further used to configure a first index and/or a second index for the first uplink resource, the first index is used to indicate whether to release the first uplink resource, and the second index is used to indicate whether to disable the first uplink resource.

With reference to the fourth aspect, in an embodiment of the fourth aspect, the first information is used to indicate to release or disable all uplink resources that are configured by the network device and that are used by the terminal device to perform uplink transmission in idle mode.

With reference to the fourth aspect, in an embodiment of the fourth aspect, the processing module is configured to determine, according to the indication of the first information and in the following manner, whether to release the first uplink resource:

if the first information includes at least one first index, when determining that the first index corresponding to the first uplink resource belongs to the at least one first index, determining to release the first uplink resource; and when determining that the first index corresponding to the first uplink resource does not belong to the at least one first index, determining not to release the first uplink resource; or if the first information includes a first condition, when determining that the first uplink resource meets the first condition, determining to release the first uplink resource; and when determining that the first uplink resource does not meet the first condition, determining not to release the first uplink resource.

With reference to the fourth aspect, in an embodiment of the fourth aspect, the processing module is configured to determine, according to the indication of the first information and in the following manner, whether to disable the first uplink resource:

if the first information includes at least one second index, when determining that the second index corresponding to the first uplink resource belongs to the at least one second index, determining to disable the first uplink resource; and when determining that the second index corresponding to the first uplink resource does not belong to the at least one second index, determining not to disable the first uplink resource; or if the first information includes a second condition, when determining that the first uplink resource meets the second condition, determining to disable the first uplink resource; and when determining that the first uplink resource does not meet the second condition, determining not to disable the first uplink resource.

With reference to the fourth aspect, in an embodiment of the fourth aspect, the transceiver module is configured to receive the first information from the network device in the following manner:

when the communication device has to-be-sent uplink data, receiving a broadcast message from the network device, where the broadcast message includes the first information; or receiving the first information in a paging manner.

With reference to the fourth aspect, in an embodiment of the fourth aspect, the transceiver module is configured to receive the first information in a paging manner in the following manner:

receiving, at a paging occasion, DCI used to schedule a paging message, where the DCI includes the first information; or after receiving, at a paging occasion, DCI used to schedule a paging message, receiving the paging message, where the paging message includes the first information.

With reference to the fourth aspect, in an embodiment of the fourth aspect, the transceiver module is configured to receive the first information in a paging manner in the following manner:

receiving, at a paging occasion, DCI scrambled by a first RNTI, where the DCI includes the first information, and the first RNTI is not a P-RNTI; or after receiving, at a paging occasion, DCI scrambled by a first RNTI, receiving a PDSCH scheduled by the DCI, where the PDSCH includes the first information, and the first RNTI is not a P-RNTI.

With reference to the fourth aspect, in an embodiment of the fourth aspect, the broadcast message is a SIB and/or a MIB.

With reference to the fourth aspect, in an embodiment of the fourth aspect, the processing module is further configured to:

release or disable the first uplink resource according to an indication of the first information, to avoid sending the uplink data by using the first uplink resource; or skip releasing or disabling the first uplink resource according to an indication of the first information, and send the uplink data by using the first uplink resource by using the transceiver.

For technical effects brought by the fourth aspect or the possible implementations of the fourth aspect, refer to the descriptions of the technical effects brought by the second aspect or the implementations of the second aspect.

According to a fifth aspect, a third type of communication apparatus is provided. The communication apparatus is, for example, the foregoing first communication apparatus. The communication apparatus includes a processor and a transceiver, configured to implement the method according to any one of the first aspect or the possible designs of the first aspect. For example, the communication apparatus is a chip disposed in a communication device. For example, the communication device is a network device. For example, the transceiver is implemented by using an antenna, a feeder, and a codec in the communication device. Alternatively, if the communication apparatus is a chip disposed in a communication device, the transceiver is, for example, a communication interface in the chip. The communication interface is connected to a radio frequency transceiver component in the communication device, to receive and send information by using the radio frequency transceiver component.

The processor is configured to determine to release or disable one or more uplink resources, where the uplink resources are used to receive uplink data from a terminal device in idle mode.

The transceiver is configured to send first information, where the first information is used to indicate to release or disable a part or all of the one or more uplink resources.

With reference to the fifth aspect, in an embodiment of the fifth aspect, the one or more uplink resources include all uplink resources that are configured by the network device and that are used by the terminal device to perform uplink transmission in idle mode.

With reference to the fifth aspect, in an embodiment of the fifth aspect, the first information includes at least one first index, used to indicate to release an uplink resource that is corresponding to the at least one first index and that is in the one or more uplink resources; or the first information includes a first condition, used to indicate to release an uplink resource that meets the first condition and that is in the one or more uplink resources.

With reference to the fifth aspect, in an embodiment of the fifth aspect, the first information includes at least one second index, used to indicate to disable an uplink resource that is corresponding to the at least one second index and that is in the one or more uplink resources; or the first information includes a second condition, used to indicate to disable an uplink resource that meets the second condition and that is in the one or more uplink resources.

With reference to the fifth aspect, in an embodiment of the fifth aspect, the transceiver is further configured to send second information to a first terminal device, where the second information is used to configure a first uplink resource for the first terminal device, the second information is further used to configure a first index and/or a second index for the first uplink resource, the first index is used to indicate whether to release the first uplink resource, and the second index is used to indicate whether to disable the first uplink resource.

With reference to the fifth aspect, in an embodiment of the fifth aspect, the transceiver is configured to send the first information in the following manner:

sending a system message, where the system message includes the first information, and the system message is a SIB and/or a MIB; or sending the first information in a paging manner.

With reference to the fifth aspect, in an embodiment of the fifth aspect, the transceiver is configured to send the first information in a paging manner in the following manner:

sending, at a paging occasion, DCI used to schedule a paging message, where the DCI includes the first information; or after sending, at a paging occasion, DCI used to schedule a paging message, sending the paging message, where the paging message includes the first information.

With reference to the fifth aspect, in an embodiment of the fifth aspect, the transceiver is configured to send the first information in a paging manner in the following manner:

sending, at a paging occasion, DCI scrambled by a first RNTI, where the DCI includes the first information, and the first RNTI is not a P-RNTI; or after sending, at a paging occasion, DCI scrambled by a first RNTI, sending a PDSCH scheduled by the DCI, where the PDSCH includes the first information, and the first RNTI is not a P-RNTI.

For technical effects brought by the fifth aspect or the possible implementations of the fifth aspect, refer to the descriptions of the technical effects brought by the first aspect or the implementations of the first aspect.

According to a sixth aspect, a fourth type of communication apparatus is provided. The communication apparatus is, for example, the foregoing second communication apparatus. The communication apparatus includes a processor and a transceiver, configured to implement the method according to any one of the second aspect or the possible designs of the second aspect. For example, the communication apparatus is a chip disposed in a communication device. For example, the communication device is a terminal device. For example, the transceiver is implemented by using an antenna, a feeder, and a codec in the communication device. Alternatively, if the communication apparatus is a chip disposed in a communication device, the transceiver is, for example, a communication interface in the chip. The communication interface is connected to a radio frequency transceiver component in the communication device, to receive and send information by using the radio frequency transceiver component.

The transceiver is configured to receive second information from a network device, where the second information is used to configure a first uplink resource for the communication device, and the first uplink resource is used by the communication device in idle mode to send uplink data to the network device.

The transceiver is further configured to receive first information from the network device.

The processor is configured to determine, according to an indication of the first information, whether to release or disable the first uplink resource.

With reference to the sixth aspect, in an embodiment of the sixth aspect, the second information is further used to configure a first index and/or a second index for the first uplink resource, the first index is used to indicate whether to release the first uplink resource, and the second index is used to indicate whether to disable the first uplink resource.

With reference to the sixth aspect, in an embodiment of the sixth aspect, the first information is used to indicate to release or disable all uplink resources that are configured by the network device and that are used by the terminal device to perform uplink transmission in idle mode.

With reference to the sixth aspect, in an embodiment of the sixth aspect, the processor is configured to determine, according to the indication of the first information and in the following manner, whether to release the first uplink resource:
- if the first information includes at least one first index, when determining that the first index corresponding to the first uplink resource belongs to the at least one first index, determining to release the first uplink resource; and when determining that the first index corresponding to the first uplink resource does not belong to the at least one first index, determining not to release the first uplink resource; or
- if the first information includes a first condition, when determining that the first uplink resource meets the first condition, determining to release the first uplink resource; and when determining that the first uplink resource does not meet the first condition, determining not to release the first uplink resource.

With reference to the sixth aspect, in an embodiment of the sixth aspect, the processor is configured to determine, according to the indication of the first information and in the following manner, whether to disable the first uplink resource:
- if the first information includes at least one second index, when determining that the second index corresponding to the first uplink resource belongs to the at least one second index, determining to disable the first uplink resource; and when determining that the second index corresponding to the first uplink resource does not belong to the at least one second index, determining not to disable the first uplink resource; or
- if the first information includes a second condition, when determining that the first uplink resource meets the second condition, determining to disable the first uplink resource; and when determining that the first uplink resource does not meet the second condition, determining not to disable the first uplink resource.

With reference to the sixth aspect, in an embodiment of the sixth aspect, the transceiver is configured to receive the first information from the network device in the following manner:
- when the communication device has to-be-sent uplink data, receiving a broadcast message from the network device, where the broadcast message includes the first information; or
- receiving the first information in a paging manner.

With reference to the sixth aspect, in an embodiment of the sixth aspect, the transceiver is configured to receive the first information in a paging manner in the following manner:
- receiving, at a paging occasion, DCI used to schedule a paging message, where the DCI includes the first information; or
- after receiving, at a paging occasion, DCI used to schedule a paging message, receiving the paging message, where the paging message includes the first information.

With reference to the sixth aspect, in an embodiment of the sixth aspect, the transceiver is configured to receive the first information in a paging manner in the following manner:
- receiving, at a paging occasion, DCI scrambled by a first RNTI, where the DCI includes the first information, and the first RNTI is not a P-RNTI; or
- after receiving, at a paging occasion, DCI scrambled by a first RNTI, receiving a PDSCH scheduled by the DCI, where the PDSCH includes the first information, and the first RNTI is not a P-RNTI.

With reference to the sixth aspect, in an embodiment of the sixth aspect, the broadcast message is a SIB and/or a MIB.

With reference to the sixth aspect, in an embodiment of the sixth aspect, the processor is further configured to:
- release or disable the first uplink resource according to an indication of the first information, to avoid sending the uplink data by using the first uplink resource; or
- skip releasing or disabling the first uplink resource according to an indication of the first information, and send the uplink data by using the first uplink resource by using the transceiver.

For technical effects brought by the sixth aspect or the possible implementations of the sixth aspect, refer to the descriptions of the technical effects brought by the second aspect or the implementations of the second aspect.

According to a seventh aspect, a fifth type of communication apparatus is provided. The communication apparatus may be the first communication apparatus in the foregoing method designs. For example, the communication apparatus is a chip disposed in a communication device. For example, the communication device is a network device. The communication apparatus includes: a memory, configured to store computer-executable program code; and a processor, where the processor is coupled to the memory. The program code stored in the memory includes instructions. When the processor executes the instructions, the fifth type of communication apparatus is enabled to perform the method according to any one of the first aspect or the possible implementations of the first aspect.

The fifth type of communication apparatus may further include a communication interface. The communication interface may be a transceiver in the network device, and is implemented by using, for example, an antenna, a feeder, and a codec in the communication apparatus. Alternatively, if the fifth type of communication apparatus is a chip disposed in the network device, the communication interface may be an input/output interface of the chip, for example, an input/output pin.

According to an eighth aspect, a sixth type of communication apparatus is provided. The communication apparatus may be the second communication apparatus in the foregoing method designs. For example, the communication apparatus is a chip disposed in a communication device. For example, the communication device is a terminal device. The communication apparatus includes: a memory, configured to store computer-executable program code; and a processor, where the processor is coupled to the memory. The program code stored in the memory includes instructions. When the processor executes the instructions, the sixth type of communication apparatus is enabled to perform the method according to any one of the second aspect or the possible implementations of the second aspect.

The sixth type of communication apparatus may further include a communication interface. The communication interface may be a transceiver in the terminal device, and is implemented by using, for example, an antenna, a feeder, and a codec in the communication apparatus. Alternatively, if the sixth type of communication apparatus is a chip disposed in the terminal device, the communication interface may be an input/output interface of the chip, for example, an input/output pin.

According to a ninth aspect, a communication system is provided. The communication system may include the first type of communication apparatus according to the third aspect, the third type of communication apparatus according to the fifth aspect, or the fifth type of communication apparatus according to the seventh aspect, and include the second type of communication apparatus according to the fourth aspect, the fourth type of communication apparatus according to the sixth aspect, or the sixth type of communication apparatus according to the eighth aspect.

According to a tenth aspect, a computer storage medium is provided. The computer-readable storage medium stores instructions. When the instructions are run on a computer, the computer is enabled to perform the method according to any one of the first aspect or the possible designs of the first aspect.

According to an eleventh aspect, a computer storage medium is provided. The computer-readable storage medium stores instructions. When the instructions are run on a computer, the computer is enabled to perform the method according to any one of the second aspect or the possible designs of the second aspect.

According to a twelfth aspect, a computer program product including instructions is provided. The computer program product stores the instructions. When the computer program product runs on a computer, the computer is enabled to perform the method according to any one of the first aspect or the possible designs of the first aspect.

According to a thirteenth aspect, a computer program product including instructions is provided. The computer program product stores the instructions. When the computer program product runs on a computer, the computer is enabled to perform the method according to any one of the second aspect or the possible designs of the second aspect.

In the embodiments of this application, the network device may implement relatively flexible management on the uplink resources that are configured for the terminal device and that are used for transmission by the terminal device in idle mode, so that the network device may also schedule the uplink resources when needing to schedule uplink resources. Reasonableness of resource management by the network device is improved, and flexibility of resource scheduling by the network device is also improved.

DESCRIPTION OF EMBODIMENTS

Figure 1:
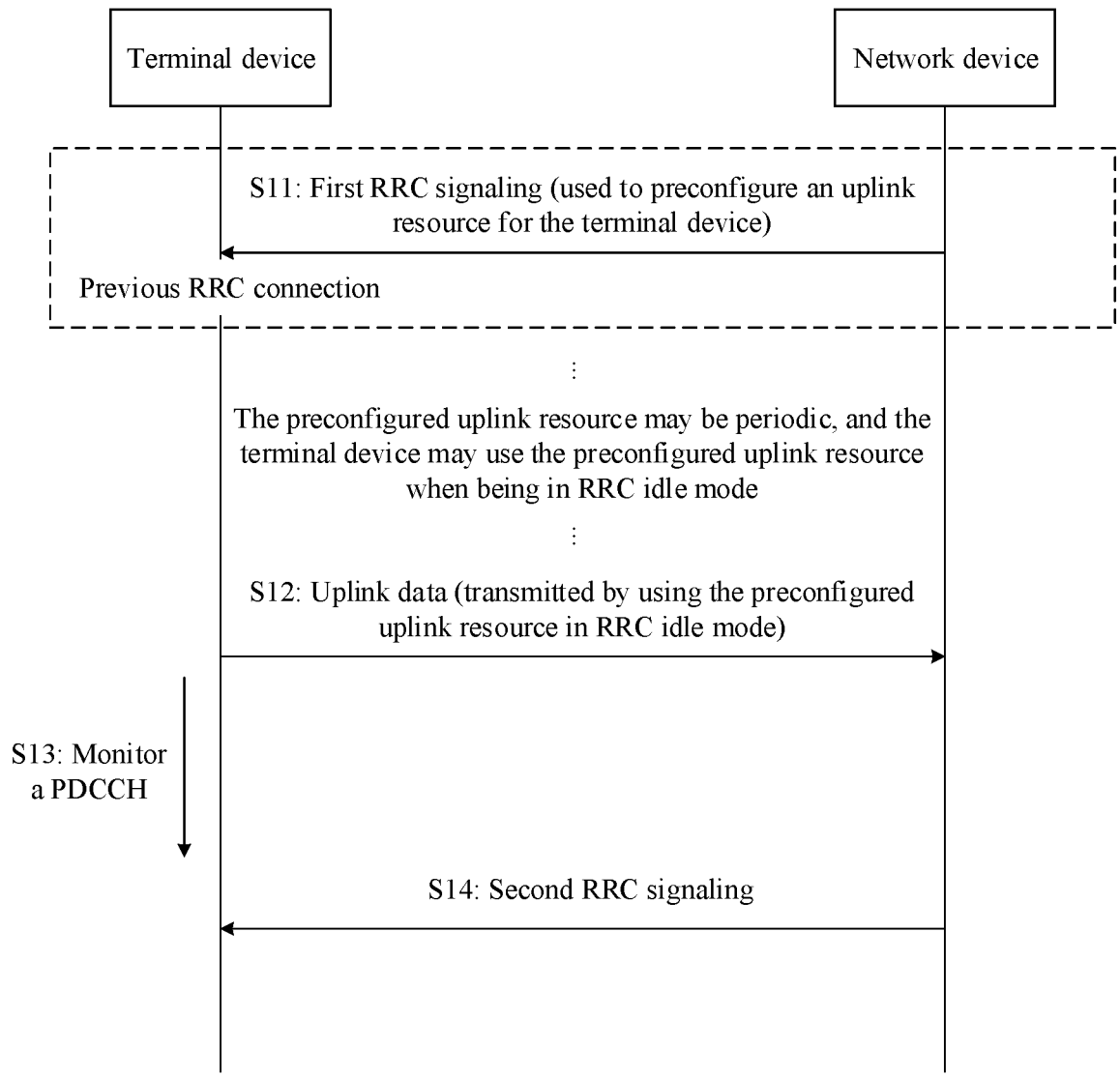
FIG. 1 is a flowchart of a PUR process in an NB-IoT system.

To make objectives, technical solutions, and advantages of embodiments of this application clearer, the following further describes the embodiments of this application in detail with reference to the accompanying drawings.

The following describes some terms in the embodiments of this application, to facilitate understanding of a person skilled in the art.

(1) A terminal device includes a device that provides a user with voice and/or data connectivity, for example, may include a handheld device having a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a device-to-device communication (D2D) terminal device, a V2X terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, or computer built-in mobile apparatus, or the like. For example, the terminal device is a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device, for example, a barcode, radio frequency identification (RFID), a sensor, a global positioning system (GPS), or a laser scanner.

By way of example, but not limitation, the terminal device in the embodiments of this application may alternatively be a wearable device. The wearable device may also be referred to as a wearable intelligent device, an intelligent wearable device, or the like, and is a generic term for wearable devices that are developed by applying wearable technologies to intelligently design daily wear, such as glasses, gloves, watches, clothes, and shoes. The wearable device is a portable device that is directly worn on a body or integrated into clothes or an accessory of the user. The wearable device is not only a hardware device, but also implements a powerful function through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

However, if the various terminal devices described above are located on a vehicle (for example, placed in the vehicle or mounted in the vehicle), the terminal devices may be considered as vehicle-mounted terminal devices. For example, the vehicle-mounted terminal devices are also referred to as on-board units (OBU).

(2) A network device, for example, includes an access network (AN) device such as a base station (such as an access point), and may be a device that is in an access network and that communicates with a wireless terminal device over an air interface through one or more cells. The base station may be configured to mutually convert a received over-the-air frame and a received internet protocol (IP) packet, and serve as a router between the terminal device and the other parts of the access network, where the other parts of the access network may include an IP network. The network device may further coordinate attribute management of the air interface. For example, the network device may include an evolved NodeB (NodeB, eNB, or e-NodeB) in an LTE system or a long term evolution-advanced (LTE-A) system, may include a next generation NodeB (gNB) in a 5th mobile communication technology (the 5th generation, 5G) new radio (NR) system, may include a centralized unit (CU) and a distributed unit (DU) in a cloud access network (Cloud RAN) system, or may include a relay device. This is not limited in the embodiments of this application.

(3) eMTC is an important branch of an internet of everything technology, and is evolved based on an LTE protocol. To be more suitable for communication between things and to reduce costs, in the eMTC, the LTE protocol is tailored and optimized. The eMTC is deployed based on a cellular network, and user equipment of the eMTC may directly access an existing LTE network by supporting a radio frequency of 1.4 MHZ and a baseband bandwidth of 1.4 MHz. The eMTC supports a maximum uplink/downlink peak rate of 1 Mbps, and can support various and innovative IoT applications.

Key capabilities of the eMTC include supporting mobility, positioning, lower costs, and a higher rate.

The eMTC has advantages in intelligent logistics, for example, anti-theft, anti-replacement, real-time temperature sensing, and positioning. Based on the eMTC, real-time monitoring and positioning can be implemented, and information is recorded and uploaded, so that a driving track can be queried. An intelligent wearable device may support functions such as health monitoring, a video service, data backhaul, or positioning. The eMTC may further add values to pipelines of carriers. Application scenarios include smart charging piles, intelligent trolleys, elevator guards, smart bus stops, public bicycle management, or the like.

(4) NB-IoT is an important branch of an internet of everything network. The NB-IoT is built on a cellular network, consumes a bandwidth of only about 180 kHz, and may be directly deployed on an LTE network or the like, to reduce deployment costs and implement smooth upgrade. Compared with a conventional cellular network, a service and a terminal device in the NB-IoT have the following features:

(1) Low service rate and long service periodicity. Compared with the conventional cellular networks, an internet of things service generates smaller data packets, and is usually less sensitive to a delay.

(2) Massive connection requirement. For internet of things terminal devices that are deployed on large scale, for example, smart water/electricity meters, smart homes, automobiles, and wearable devices, an NB-IoT base station may manage a large quantity of such terminal devices, for example, tens of thousands of terminal devices.

(3) Low cost requirement. Compared with a terminal device in the existing cellular network, in the NB-IoT, costs of a terminal device need to be lower, to implement mass deployment of terminal devices. The low cost requirement requires that implementation complexity of the terminal device is very low.

(4) Low power consumption requirement. In the NB-IoT, power consumption of the terminal device needs to be lower, to save battery power of the terminal device, and ensure an extra-long standby time of the terminal device, thereby reducing labor costs of battery replacement.

(5) Relatively low service arrival rate. Generally, a service occurs only once a few hours or even more than a day, and most of services are uplink-triggered services. To be specific, the network device does not page the terminal device. Only when the terminal device has an uplink service, the network device sends downlink response data to the terminal device after receiving the uplink service.

(5) The terms "system" and "network" may be interchangeably used in the embodiments of this application. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one item (piece) of the following" or a similar expression thereof means any combination of these items, including a singular item (piece) or any combination of plural items (pieces). For example, at least one item (piece) of a, b, or c may represent: a, b, c, a-b, a-c, b-c, or a-b-c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects. For example, a first priority criterion and a second priority criterion are merely used to distinguish between different criteria, but do not indicate different content, priorities, importance, or the like of the two criteria.

In addition, the terms "include" and "have" in the embodiments, claims, and accompanying drawings of this application are not exclusive. For example, a process, method, system, product, or device including a series of steps or modules is not limited to the listed steps or modules, and may further include a step or module that is not listed.

The foregoing describes some concepts in the embodiments of this application. The following describes technical features in the embodiments of this application.

Mobile communication has greatly changed people's lives, but a pursuit of mobile communication with higher performance has never stopped. A 5G system emerges to cope with future explosive growth of mobile data traffic, massive device connections, and various emerging new services and application scenarios. As a part of 5G, an internet of things has a rapidly increasing market demand. A forecast shows that a quantity of connections to the 5G internet of things will reach 18 billion by the year 2022.

Currently, a solution for a feature of the internet of things has been proposed in a 3GPP standard based on a cellular network. For example, an NB-IoT network and an eMTC network can carry IoT services by using a feature of a narrowband technology. The NB-IoT network uses a new air interface technology independent of an existing cellular network (LTE), a terminal device has lower costs, and a lower rate and lower mobility are supported. As a sub-characteristic of the existing cellular network (LTE), for a feature of the internet of things, the eMTC network may support an IoT service in an LTE network.

Both NB-IoT and eMTC have been commercially used on large scale since the Rel-13, and the standards continuously evolve from the Rel-14 and the Rel-15. The Rel-16 is being discussed in the 3GPP standard. In each release, a new feature is added to the standard to continuously optimize system performance. For example, for a feature that a terminal device needs to establish an RRC connection even if the terminal device sends a small amount of data, to reduce steps such as connection or release required by the terminal device to establish the RRC connection, and reduce data transmission power consumption, an EDT mechanism is introduced in the Rel-15. In the EDT mechanism, the terminal device is allowed to transmit a small amount of data by using a message (Msg3) in a random access procedure, and ends a transmission procedure after Msg4 without needing to enter connected mode.

However, even if the EDT mechanism is available, the Msg3 can carry a very small amount of data. Therefore, if the terminal device needs to transmit a relatively large amount of data, the EDT mechanism still cannot meet a requirement that the terminal device in RRC idle mode transmits the data. It can be learned that there is still room for optimization of transmission of a small amount of data by the terminal device. Therefore, in the embodiments of this application, it may be considered that an uplink resource may be preconfigured for the terminal device in a preconfigured uplink resource (PUR) manner. The PUR manner means that in a previous (RRC) connection of the terminal device, a base station preconfigures an uplink resource for the terminal device. After the terminal device releases the RRC connection and enters RRC idle mode, if uplink data is sent, the preconfigured uplink resource may be directly used, thereby avoiding a random access procedure of the terminal device. This helps reduce the power consumption of the terminal device.

For example, refer to FIG. 1. An NB-IoT system is used as an example to describe a general process of determining a PUR based on an existing discussion.

S11: After an RRC connection is established between a terminal device and a base station, the base station sends the terminal device RRC signaling, for example, referred to as first RRC signaling, and the terminal device receives the first RRC signaling from the base station, where the first RRC signaling is used to preconfigure an uplink resource for the terminal device.

For example, the first RRC signaling may be RRC connection setupsignaling. RRC reestablishment signaling, RRC resume signaling. RRC release signaling, or RRC reconfigurationsignaling.

The preconfigured uplink resource may be a periodic resource, that is, may be periodically used by the terminal device. The base station may send information about the preconfigured uplink resource to the terminal device by using the RRC signaling. The information about the preconfigured uplink resource may include at least one of the following: a periodicity of the uplink resource, a time-domain/frequency-domain starting position of the uplink resource, a validity period of the uplink resource (namely, duration in which the uplink resource can be used), a size of a transport block (TB) of the uplink resource, a modulation and coding scheme (MCS) of the uplink resource, a bandwidth of the uplink resource, frequency hopping information of the uplink resource, or the like.

S12: In RRC idle mode (also referred to as idle mode for short in this specification), the terminal device sends uplink data to the base station by using the preconfigured uplink resource.

After entering idle mode, if the terminal device needs to send uplink data and determines that a preconfigured uplink resource exists, the terminal device may determine whether a size of the uplink resource is greater than or equal to an amount of the data of the terminal device, determine whether the terminal device maintains uplink synchronization with the base station, and determine whether the uplink resource is valid. If the terminal device determines that the size of the uplink resource is greater than or equal to the amount of the data of the terminal device, the terminal device maintains uplink synchronization with the base station, and the uplink resource is valid, the terminal device may send the uplink data to the base station by using the uplink resource.

S13: After sending the uplink data, the terminal device monitors a physical downlink control channel (PDCCH).

For example, after sending the uplink data, the terminal device may start a timer, to monitor the PDCCH within duration of the timer. The duration of the timer may be specified in a protocol.

A purpose of monitoring the PDCCH by the terminal device may include at least one of the following several types: receiving scheduling information (used to schedule uplink retransmission) of the base station for the uplink data transmitted in S12, receiving response information of the base station for the uplink data transmitted in S12, receiving scheduling information of the base station for downlink response information that is to be sent by the base station, or receiving scheduling information of the base station for a downlink RRC message.

S14: After receiving the uplink data, the base station sends the terminal device RRC signaling, for example, referred to as second RRC signaling, and the terminal device receives the second RRC signaling from the base station.

S14 is not mandatory. Alternatively, the base station may not send the second RRC signaling to the terminal device. In this case, S14 does not need to be performed.

A possible purpose of sending the second RRC signaling by the base station to the terminal device includes at least one of the following:

(1) Indicating the terminal device to maintain RRC idle mode. This may also indicate that it is determined that the uplink data has been transmitted, and no further downlink response information needs to be sent. For this purpose, the second RRC signaling may alternatively carry downlink response information.

(2) Indicating the terminal device to enter RRC connected mode (also referred to as connected mode for short in this specification). Downlink data or downlink response information buffered in a core network may be excessively large and cannot be completely sent in one data packet. Therefore, the terminal device needs to enter RRC connected mode for receiving.

(3) Reconfiguring, for the terminal device, the uplink resource preconfigured in S11, or indicating the terminal device to release the uplink resource preconfigured in S11.

It can be learned from S11 and S12 that the uplink resource preconfigured by using the PUR is used by the terminal device in idle mode, and may occur periodically. For example, currently, a main scenario of the PUR is that an internet of things terminal device in idle mode performs periodic reporting. For example, a water meter or an electricity meter reports a reading every several hours. Therefore, a periodicity (or a validity period) of the preconfigured uplink resource may be at an hour-level granularity. For example, the periodicity of the uplink resource may be one or more hours, or the validity period of the uplink resource may be one or more hours.

Currently, once uplink resources are preconfigured for the terminal device in the PUR manner, because the terminal device does not monitor any unicast signaling in idle mode, the base station cannot perform other scheduling on the preconfigured uplink resources. In other words, even if the terminal device for which the uplink resources are preconfigured does not use these uplink resources in idle mode, these uplink resources cannot be used by another terminal device. For example, when services of the base station are relatively busy, some services may lack uplink resources, but uplink resources preconfigured for some terminal devices may be in idle mode and cannot be used. In addition, a periodicity (or a validity period) of the uplink resource preconfigured for the terminal device may also be at an hour-level granularity. In other words, the terminal device occupies a relatively long period of time. Consequently, the base station cannot schedule the uplink resources in a relatively long period of time. It can be learned that, because preconfigured resources are not effectively managed, and resource scheduling by the base station is improper, a problem may occur in some communication processes under coverage of the base station. For example, some terminal devices in connected mode covered by the base station need to send uplink data to the base station by using uplink resources, but the base station does not have sufficient uplink resources to be scheduled. As a result, these terminal devices may fail to send the uplink data, causing transmission failures. Alternatively, congestion occurs because the terminal devices need to send a relatively large amount of data by using a relatively small quantity of uplink resources.

In view of this, the technical solutions in the embodiments of this application are provided. In the embodiments of this application, the uplink resources used by the terminal device to send the uplink data in idle mode may be allocated to the terminal device, so that the terminal device may send the uplink data in idle mode by using the allocated uplink resources. Compared with uplink data sent in an EDT manner, an amount of the uplink data that can be sent by using these uplink resources may be relatively large, so that a data transmission requirement of the terminal device in RRC idle mode is met. In addition, for example, when network load is relatively heavy, the network device may determine to release or disable at least one uplink resource. In this case, the network device may broadcast first information, and indicate, by using the first information, to release or disable the at least one uplink resource. Therefore, after receiving the first information, the terminal device may determine to release or disable a corresponding uplink resource according to an indication of the first information, so that the network device performs other scheduling on the uplink resource. It can be learned that, according to the technical solution provided in the embodiments of this application, the network device may implement relatively flexible management on the uplink resources that are configured for the terminal device and that are used for transmission by the terminal device in idle mode, so that the network device may also schedule the uplink resources when needing to schedule uplink resources. In this way, reasonableness of resource management by the network device is improved, flexibility of resource scheduling by the network device is improved, normal communication process covered by the network device can be ensured as much as possible, a probability of a problem such as a service transmission failure or congestion is reduced, and resource utilization is also improved.

Figure 2:
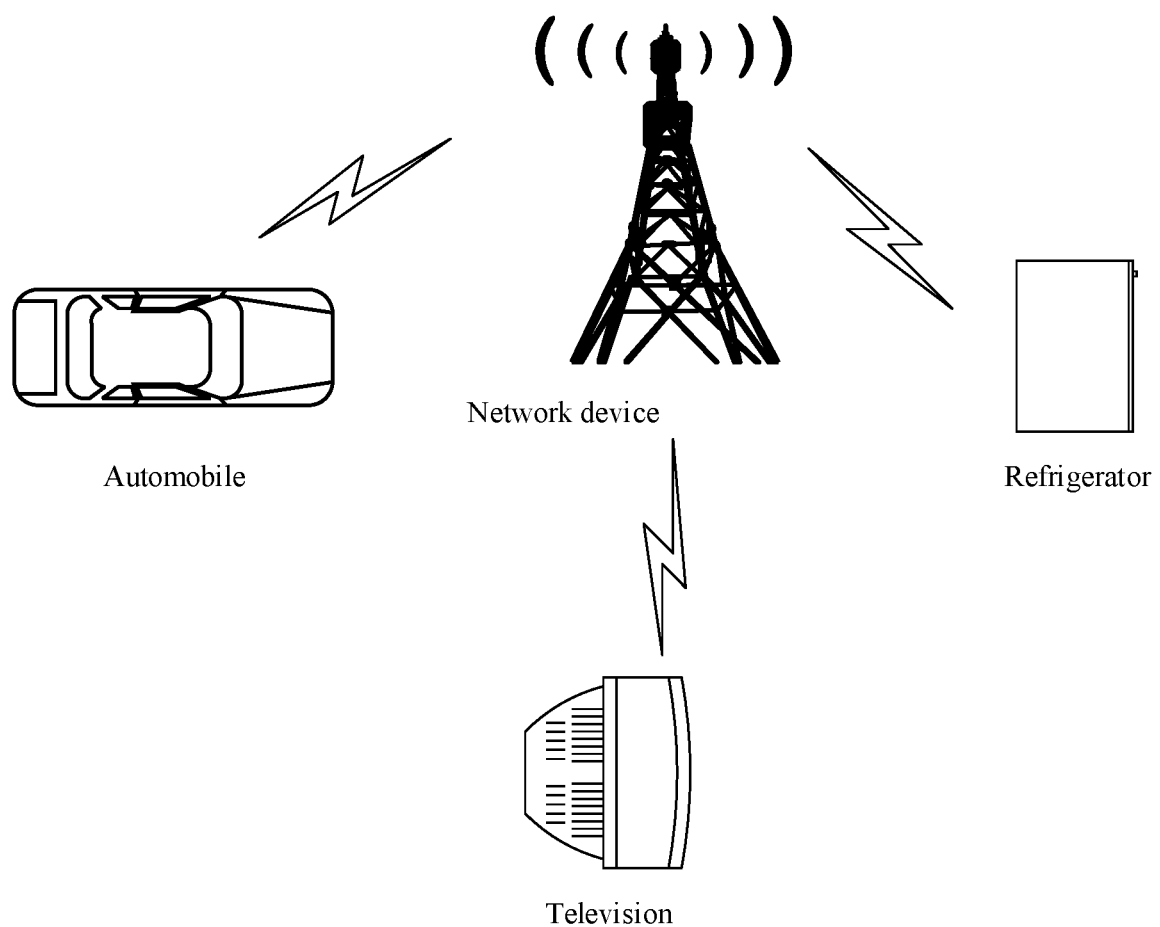
FIG. 2 is a schematic diagram of an application scenario according to an embodiment of this application.

The technical features of the embodiments of this application are described above. FIG. 2 is a schematic diagram of an application scenario according to an embodiment of this application.

A network device and a plurality of terminal devices are included in FIG. 2. These terminal devices are terminal devices in an NB-IoT system or terminal devices in an eMTC system, for example, a refrigerator, an automobile, and a television. The network device and the at least one terminal device shown in FIG. 2 may be configured to implement the technical solutions provided in the embodiments of this application.

The network device in FIG. 2 is, for example, an access network device such as a base station. The access network device is corresponding to different devices in different systems. For example, the access network device may be corresponding to an eNB in a 4th generation mobile communication technology (4G) system, and corresponding to a 5G access network device, such as a gNB, in a 5G system.

With reference to the accompanying drawings, the following describes the technical solutions provided in the embodiments of this application.

Figure 3:
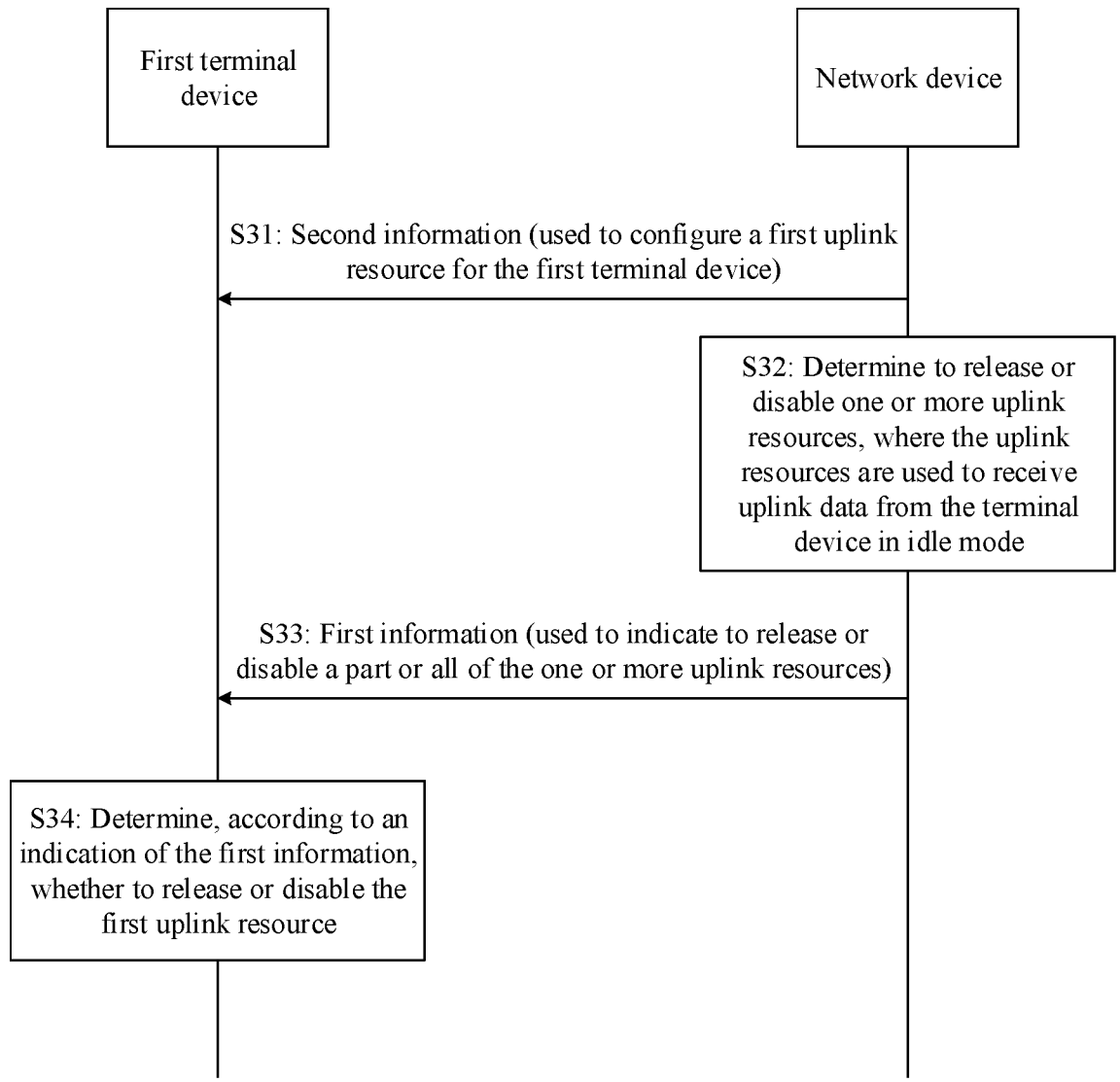
FIG. 3 is a flowchart of a resource management method according to an embodiment of this application.

An embodiment of this application provides a resource management method. FIG. 3 is a flow chart of this method. In the following description process, an example in which the method is used for the network architecture shown in FIG. 2 is used. In addition, the method may be performed by two communication apparatuses. The two communication apparatuses are, for example, a first communication apparatus and a second communication apparatus. The first communication apparatus may be a network device or a communication apparatus that can support the network device in implementing a required function of the method, or may be a terminal device or a communication apparatus that can support the terminal device in implementing a required function of the method. Certainly, the first communication apparatus may alternatively be another communication apparatus, for example, a chip system. The second communication apparatus may be a network device or a communication apparatus that can support the network device in implementing a required function of the method, or may be a terminal device or a communication apparatus that can support the terminal device in implementing a required function of the method. Certainly, the second communication apparatus may alternatively be another communication apparatus, for example, a chip system. In addition, implementations of the first communication apparatus and the second communication apparatus are not limited. For example, the two communication apparatuses may be implemented in a same form, for example, implemented in a form of a device. Alternatively, the two communication apparatuses may be implemented in different forms. For example, the first communication apparatus is implemented in a form of a device, and the second communication apparatus is implemented in a manner of a chip system, or the like. For example, the network device is a base station.

For ease of description, the following uses an example in which the method is performed by a network device and a first terminal device, that is, an example in which the first communication apparatus is the network device and the second communication apparatus is the first terminal device. For example, this embodiment is applied to the network architecture shown in FIG. 2. Therefore, in the following descriptions, the network device may be the network device in the network architecture shown in FIG. 2, and the first terminal device may be any terminal device in the network architecture shown in FIG. 2.

S31: The network device sends second information to the first terminal device, and the first terminal device receives the second information from the network device, where the second information is used to configure a first uplink resource for the first terminal device, and the first uplink resource is used by the first terminal device in idle mode to send uplink data to the network device.

In this embodiment of this application, the network device may configure (or may be described as pre-configure, where "pre-configure" means that a configured uplink resource is configured when the terminal device is in RRC connected mode, and is not used temporarily after being configured, but is used only after the terminal device enters RRC idle mode) one or more uplink resources for the terminal device. It may be understood that the one or more uplink resources are preconfigured by the network device for the terminal device in a PUR manner. One uplink resource is, for example, an uplink resource that meets a condition, or an uplink resource of a type. No specific limitation is imposed. For example, if there are a plurality of uplink resources that meet a condition, the network device may configure one or more of the uplink resources for one terminal device. Similarly, if there may be a plurality of uplink resources of a type, the network device may configure one or more of the uplink resources for one terminal device.

The type of the uplink resource may be defined in a protocol, or may be indicated by using a system broadcast. If the indication is performed by using a system broadcast, for example, the type of the uplink resource may be classified by the network device based on a service feature. For example, the network device may classify an uplink resource having a relatively large TBS into one type, and the uplink resource of this type may be used to support transmission of a relatively large amount of data. Alternatively, the network device may classify an uplink resource having a relatively small resource periodicity into one type, and the uplink resources of this type may be used to support relatively delay-sensitive data transmission, or the like. An advantage of defining different types of uplink resources is that when the network device configures uplink resources, less information can be sent, thereby saving signaling. For example, only an indication of a corresponding type may be sent, or an indication of a corresponding type and some resource parameters different from this type may be sent.

For example, one uplink resource is an uplink resource that meets a condition. If the network device configures a plurality of uplink resources for one terminal device, the plurality of uplink resources may meet a same condition, or may separately meet different conditions. Alternatively, one uplink resource is an uplink resource of a type. If the network device configures a plurality of uplink resources for one terminal device, the plurality of uplink resources may be uplink resources of a same type, or may be uplink resources of different types.

Conditions met by the uplink resource are described later.

For example, for a terminal device, for example, referred to as a first terminal device, the network device may send second information to the first terminal device. The second information is used to configure an uplink resource, for example, referred to as a first uplink resource, for the terminal device. The first uplink resource may include one or more uplink resources. For example, the second information may be carried in first RRC signaling in S11 in FIG. 1.

In an optional manner, in addition to configuring the first uplink resource for the first terminal device, the network device may further configure a first index and/or a second index for the configured first uplink resource. For example, the network device may configure the first index or the second index for the first uplink resource, or configure the first index and the second index for the first uplink resource. One first index may be corresponding to one uplink resource. In this case, if the first uplink resource includes one uplink resource, the network device may configure one first index for the first uplink resource; or if the first uplink resource includes a plurality of uplink resources, the network device may configure a plurality of first indexes for the first uplink resource. The first indexes may be in a one-to-one correspondence with the plurality of uplink resources included in the first uplink resource. Similarly, one second index may be corresponding to one uplink resource. In this case, if the first uplink resource includes one uplink resource, the network device may configure one second index for the first uplink resource; or if the first uplink resource includes a plurality of uplink resources, the network device may configure a plurality of second indexes for the first uplink resource. The second indexes may be in a one-to-one correspondence with the plurality of uplink resources included in the first uplink resource.

In addition, the network device may further configure a third index for the configured first uplink resource. It may be understood that the network device may configure at least one of the first index, the second index, or the third index for the first uplink resource. For example, only the first index may be configured for the first uplink resource; only the second index may be configured for the first uplink resource; only the third index may be configured for the first uplink resource; only the first index and the second index may be configured for the first uplink resource; only the first index and the third index may be configured for the first uplink resource; only the second index and the third index may be configured for the first uplink resource; or the first index, the second index, and the third index may be configured for the first uplink resource. One third index may be corresponding to one uplink resource. In this case, if the first uplink resource includes one uplink resource, the network device may configure one third index for the first uplink resource; or if the first uplink resource includes a plurality of uplink resources, the network device may configure a plurality of third indexes for the first uplink resource. The third indexes may be in a one-to-one correspondence with the plurality of uplink resources included in the first uplink resource. The third index may be used to indicate whether to modify a corresponding uplink resource, and "modify." herein may also be understood as "reconfigure".

For an uplink resource, the network device may configure at least one of the first index, the second index, or the third index for the uplink resource. For example, only the first index, the second index, or the third index may be configured for the uplink resource; only the first index and the second index may be configured for the uplink resource; only the second index and the third index may be configured for the uplink resource; only the first index and the third index may be configured for the uplink resource; or the first index, the second index, and the third index may be configured for the uplink resource. Functions of the first index, the second index, and the third index are described later.

For example, while configuring the first uplink resource for the first terminal device, the network device may configure the first index and/or the second index for the first uplink resource. For example, if the network device configures the first uplink resource for the first terminal device by using the second information, the network device may further configure the first index and/or the second index for the first uplink resource by using the second information. Alternatively, the network device configures the uplink resource for the first terminal device and configures the first index and/or the second index for the first uplink resource by using different information. For example, if the network device configures the first uplink resource for the first terminal device by using the second information, the network device may further configure the first index and/or the second index for the first uplink resource by using third information. The second information and the third information may be carried in a same piece of signaling. The signaling is, for example, higher layer signaling, such as RRC signaling or a media access control control element (MAC CE), or may be physical layer signaling, such as downlink control information (DCI). No specific limitation is imposed. Alternatively, the second information and the third information may be carried in different signaling, for example, carried in two pieces of RRC signaling, or the second information is carried in RRC signaling and the third information is carried in DCI. In addition, if the network device separately configures the first uplink resource for the first terminal device and configures the first index and/or the second index for the first uplink resource by using two pieces of signaling, the network device may send the two pieces of signaling at the same time, may first send signaling used to configure the first uplink resource for the terminal device, or may first send signaling for configuring the first index and/or the second index for the first uplink resource. Alternatively, if the network device needs to configure the first index and the second index for the first uplink resource, both the first index and the second index may be configured by using one piece of signaling, or the first index and the second index may be separately configured by using two pieces of signaling. No specific limitation is imposed.

Similarly, while configuring the first uplink resource for the first terminal device, the network device may configure the third index for the first uplink resource. For example, if the network device configures the first uplink resource for the first terminal device by using the second information, the network device may further configure the third index for the first uplink resource by using the second information. Alternatively, the network device configures the uplink resource for the first terminal device and configures the third index for the first uplink resource by using different information.

If the network device needs to configure first indexes for uplink resources configured for a plurality of terminal devices, configuration manners are similar. For details, refer to related descriptions about configuring the first index for the first uplink resource by the network device. In addition, the network device configures the first indexes for the uplink resources configured for the plurality of terminal devices. Configuration processes may be performed simultaneously, or may not be performed simultaneously. No specific limitation is imposed. This is the same for the second index and the third index, and details are not described.

The first index may be used to identify an uplink resource. For example, one first index may identify one or more uplink resources, and this is the same for the second index and the third index. For the network device, different indexes are associated with different operations of the network device, or are associated with different content indicated by the network device. For example, for an uplink resource for which the first index is configured, if the network device needs to indicate to release the uplink resource, the network device may perform the indication by sending the first index. In this case, the first index may be considered as used to indicate whether to release the uplink resource. For an uplink resource for which the second index is configured, if the network device needs to indicate to disable the uplink resource, the network device may perform the indication by sending the second index. In this case, the second index may be considered as used to indicate whether to disable the uplink resource. For an uplink resource for which the third index is configured, if the network device needs to indicate to modify the uplink resource, the network device may perform the indication by sending the third index. In this case, the third index may be considered as used to indicate whether to modify the uplink resource.

"Release" means completely releasing the uplink resource. If the uplink resource needs to be used again, the network device needs to reconfigure the uplink resource. "Disable" means that when a disabling condition is met, a terminal device for which the uplink resource is configured is disabled from using the uplink resource, and when the disabling condition is not met, the terminal device may still use the uplink resource. For example, the disabling condition is a period of time. In this case, the terminal device for which the uplink resource is configured is disabled from using the uplink resource within the period of time, and the terminal device may still use the uplink resource after the period of time. "Modify" means that the uplink resource is reconfigured, so that some or all attributes of the uplink resource are changed. For example, at least one of a periodicity of the uplink resource, a time-domain/frequency-domain starting position of the uplink resource, a validity period of the uplink resource, a transport block size of the uplink resource, a modulation and coding scheme of the uplink resource, a bandwidth of the uplink resource, or frequency hopping information of the uplink resource may be modified.

S32: The network device determines to release or disable one or more uplink resources, where the uplink resources are used to receive uplink data from the terminal device in idle mode.

Certainly, in addition to determining to release or disable the one or more uplink resources, the network device may further determine to modify the one or more uplink resources.

For the terminal device, the uplink resource is used by the terminal device in idle mode to send the uplink data to the network device. Unless otherwise specified, idle mode of the terminal device in this specification is RRC idle mode, and connected mode of the terminal device is RRC connected mode.

In addition, idle mode of the terminal device in this specification refers to a mode in which the terminal device does not establish a complete RRC connection to the network device, and therefore cannot receive downlink unicast data and signaling at any time. In a 5G system, RRC inactive mode is similar to idle mode of the terminal device described in this specification. That is, in the embodiments of this application, the uplink resource configured by the network device for the terminal device by using the second information may be used by the terminal device in idle mode to send the uplink data to the network device, or may be used by the terminal device in RRC inactive mode to send the uplink data to the network device. In this specification, an example in which the uplink resource is used by the terminal device in idle mode to send the uplink data to the network device is mainly used.

For example, the network device may determine some uplink resources that need to be released or disabled when network load is relatively heavy or network resources are insufficient. The one or more uplink resources may be configured for one terminal device, or may be configured for a plurality of terminal devices.

S33: The network device sends first information, and the first terminal device receives the first information from the network device. For the network device, the first information is used to indicate to release or disable a part or all of the one or more uplink resources.

Alternatively, the first information is used to indicate to modify a part or all of the one or more uplink resources.

There may be a plurality of terminal devices that can receive the first information sent by the network device, and processing manners of the plurality of terminal devices are similar. Therefore, in this embodiment of this application, a first terminal device in the plurality of terminal devices is still used as an example for description.

Currently, although an EDT mechanism is introduced in the Rel-15, in the EDT mechanism, the terminal device is allowed to transmit a small amount of data by using Msg3, and ends a transmission procedure after Msg4 without entering connected mode. However, even if the EDT mechanism is available, the Msg3 can carry a very small amount of data. Therefore, if the terminal device needs to transmit a relatively large amount of data, the EDT mechanism still cannot meet a requirement that the terminal device in RRC idle mode transmits the data. Therefore, it is proposed in this embodiment of this application that an uplink resource may be preconfigured for a terminal device in a PUR manner, so that the terminal device in idle mode may send uplink data to a network device by using the configured uplink resource, to meet a data transmission requirement of the terminal device in idle mode. However, because the terminal device does not monitor any unicast signaling in idle mode, the network device cannot notify the terminal device in idle mode to release the preconfigured uplink resource. When network load is heavy, because the terminal device in idle mode does not release the preconfigured uplink resource, configurable resources of the network device may be insufficient. It can be learned that, because reserved resources are not effectively managed, resource scheduling by the network device is improper. Consequently, a problem may occur in some communication processes under coverage of the network device. For example, some terminal devices covered by the network device need to send uplink data to the network device by using uplink resources, but the network device cannot schedule sufficient uplink resources. As a result, these terminal devices may fail to send the uplink data.

In view of this, it is proposed in this embodiment of this application that, for example, when the network load is relatively heavy, when an uplink resource needs to be used in another communication process covered by the network device, or when the terminal device does not use the configured uplink resource or does not use the configured uplink resource for a long period of time, the network device may perform S32, that is, may determine to release or disable one or more uplink resources. The uplink resources are resources that are configured for the terminal device and that are used by the terminal device to send uplink data in idle mode, so that the uplink resources are used in a communication process in which an uplink resource is more urgently needed, improving resource utilization.

If the network device determines that at least one uplink resource needs to be released, disabled, or modified, the network device may generate the first information, where the first information is used to indicate to release, disable, or modify the at least one uplink resource. The network device sends the first information to notify the terminal device in idle mode, so that the terminal device in idle mode can release or disable a corresponding uplink resource. When the terminal device is in idle mode, the terminal device usually monitors only a broadcast message or a paging message sent by the network device, and may not monitor a unicast message. Therefore, in this embodiment of this application, to enable the terminal device in idle mode to receive the first information sent by the network device, the network device may send the first information in a broadcast manner or a paging manner in S33.

For example, the network device may send the first information in a broadcast manner, where the first information may be carried in a broadcast message, and the terminal device may obtain the first information after receiving the broadcast message. Alternatively, the network device may send the first information in a paging manner, and the terminal device receives the first information in a paging manner. When determining that uplink data needs to be transmitted and determining that the network device pre-configures an uplink resource for a terminal device, the terminal device may detect a system message before performing uplink transmission. "Detect" herein may also be understood as "receive". Before performing uplink transmission, the terminal device may receive a system message from the network device. For example, the system message is a MIB and/or a SIB. The network device usually sends the system message periodically. Therefore, the terminal device can receive the system message before performing uplink transmission.

For example, if the first information is carried in a broadcast message, the first terminal device may receive (or described as detect) the broadcast message from the network device when there is to-be-sent uplink data, to obtain the first information carried in the broadcast message. Alternatively, if the first information is sent in a paging manner, the first terminal device may receive the first information in a paging manner.

If the first information is carried in a broadcast message, the broadcast message is, for example, a master information block (MIB) and/or a system information block (SIB). For example, if all of the first information is carried in a MIB, the broadcast message is the MIB; if all of the first information is carried in a SIB, the broadcast message is the SIB; or if a part of the first information is carried in a MIB, and a remaining part of the first information is carried in a SIB, the broadcast message is the SIB and the MIB.

Alternatively, the network device may send the first information in a paging manner. This manner may be further divided into two sub-manners.

A: In a sub-manner 1 of the paging manner, the network device sends the first information by using a paging message.

The network device periodically sends the paging message, and the terminal device may detect a physical downlink control channel (PDCCH) at a paging occasion (PO), where the PDCCH may be scrambled by a paging-radio network temporary identifier (P-RNTI). The PDCCH carries DCI, and the network device may include the first information in the DCI. In this case, after detecting the PDCCH, the terminal device may obtain the DCI, to obtain the first information carried in the DCI.

Alternatively, the DCI may schedule a paging message. The paging message may be carried on a physical downlink shared channel (PDSCH), and the network device may further include the first information in the PDSCH. After detecting the PDCCH, the terminal device may obtain the DCI, and may determine information such as a position of the PDSCH based on the DCI, to receive the PDSCH, and obtain the first information carried on the PDSCH.

Whether the first information is carried in the DCI or the PDSCH may be specified in a protocol, or notified by the network device to the terminal device in advance. No specific limitation is imposed.

B: In a sub-manner 2 of the paging manner, the network device sends the first information in the paging manner.

In the sub-manner 1, the terminal device obtains the first information by detecting the paging message. In the manner 2, the network device may continue to send, at a paging occasion, a message carrying the first information, but the message may not be considered as a paging message. The message and the paging message are sent at the same occasion, and the terminal device also continues to detect the message at the paging occasion.

For example, the network device may preconfigure an RNTI, or a new RNTI may be specified in a protocol. For example, the new RNTI is referred to as a first RNTI. If the network device preconfigures the first RNTI, the network device may configure the first RNTI while configuring the uplink resource for the terminal device. For example, for the first terminal device, the network device may configure the first RNTI for the first terminal device by using the second information. Certainly, in addition to configuring the first RNTI while configuring the uplink resource for the terminal device, the network device may alternatively configure the first RNTI for the terminal device by using other information. No specific limitation is imposed.

In the sub-manner 2, the network device sends a PDCCH at a paging occasion, and the sent PDCCH may continue to be scrambled by a P-RNTI, or may be scrambled by the first RNTI. If the PDCCH is scrambled by the first RNTI, it indicates that the DCI carried by the PDCCH carries the first information, and the network device may send the first information in the DCI carried on the PDCCH. Alternatively, if the PDCCH is scrambled by the first RNTI, it indicates that a PDSCH scheduled by the DCI carried on the PDCCH carries the first information, and the network device may send the first information in the PDSCH scheduled by the DCI carried on the PDCCH.

The terminal device detects the PDCCH at the paging occasion. If the detected PDCCH is scrambled by the P-RNTI, the terminal device may determine that neither the DCI carried on the PDCCH nor the PDSCH scheduled by the DCI includes the first information, and the terminal device obtains the DCI and the corresponding PDSCH according to a normal procedure. If the detected PDCCH is scrambled by the first RNTI, the terminal device may determine that the DCI carried on the PDCCH or the PDSCH scheduled by the DCI includes the first information, and the terminal device may obtain the DCI carried on the PDCCH and obtain the first information carried in the DCI. Alternatively, the terminal device may determine information such as a position of the PDSCH based on the DCI, to receive the PDSCH, and may obtain the first information carried in the PDSCH.

Whether the first information is carried in the DCI or the PDSCH may be specified in a protocol, or notified by the network device to the terminal device in advance. No specific limitation is imposed.

In an optional implementation in which the network device determines to release or disable the one or more uplink resources, the one or more uplink resources may include all uplink resources that are configured by the network device and that are used by the terminal device to perform uplink transmission in idle mode. That is, the network device may configure one or more uplink resources for one or more terminal devices covered by the network device in a PUR manner. In this case, the one or more uplink resources may include all the uplink resources configured by the network device for the terminal devices. For example, when the network load is very heavy or network resources are very insufficient, the network device may determine to release or disable all the uplink resources that are configured by the network device and that are used by the terminal device to perform uplink transmission in idle mode, so that these resources can be withdrawn for corresponding transmission. Certainly, the first terminal device may determine, based on the first information, to release or disable all the uplink resources that are configured by the network device and that are used by the terminal device to perform uplink transmission in idle mode. Alternatively, the first terminal device determines, based on the first information, to release or disable only the first uplink resource configured by the network device for the first terminal device, but does not perceive that the first information is actually to release or disable all the uplink resources that are configured by the network device and that are used by the terminal device to perform uplink transmission in idle mode.

If the one or more uplink resources include all the uplink resources that are configured by the network device and that are used by the terminal device to perform uplink transmission in idle mode, an implementation of the first information may be relatively simple. For example, the first information may include 1 bit. This bit needs to be used to indicate both "release" and "disable". In this case, for example, if a value of the 1 bit is "1", it indicates that the first information indicates to release all the uplink resources that are configured by the network device and that are used by the terminal device to perform uplink transmission in idle mode; or if a value of the 1 bit is "0", it indicates that the first information indicates to disable all the uplink resources that are configured by the network device and that are used by the terminal device to perform uplink transmission in idle mode. Alternatively, for example, if a value of the 1 bit is "0", it indicates that the first information indicates to release all uplink resources that are configured by the network device and that are used by the terminal device to perform uplink transmission in idle mode; or if a value of the 1 bit is "1", it indicates that the first information indicates to disable all the uplink resources that are configured by the network device and that are used by the terminal device to perform uplink transmission in idle mode.

Alternatively, if both "release" and "disable" need to be indicated by using the 1 bit, the indication may be performed by using a position of the 1 bit. For example, if the first information of the 1 bit is located in the MIB, it indicates that the first information indicates to release all the uplink resources that are configured by the network device and that are used by the terminal device to perform uplink transmission in idle mode. If the first information of the 1 bit is located in the SIB, for example, in SIB14, it indicates that the first information indicates to disable all the uplink resources that are configured by the network device and that are used by the terminal device to perform uplink transmission in idle mode.

In conclusion, if both "release" and "disable" need to be indicated by using 1-bit first information, as long as the network device sends the first information, it indicates that all the uplink resources that are configured by the network device and that are used by the terminal device to perform uplink transmission in idle mode need to be released or disabled. As long as receiving the first information, the terminal device may determine to release or disable all the uplink resources that are configured by the network device and that are used by the terminal device to perform uplink transmission in idle mode. If the network device does not send the first information, it indicates that all the preconfigured uplink resources are neither released nor disabled. If failing to receive the first information, the terminal device may determine not to release or disable all the preconfigured uplink resources.

Alternatively, if the one or more uplink resources include all the uplink resources that are configured by the network device and that are used by the terminal device to perform uplink transmission in idle mode, 1 bit may be used to indicate only whether to release the uplink resources. In this case, if the network device needs to indicate to release a corresponding uplink resource and also indicate to disable a corresponding uplink resource, the indication information may include 2 bits, where 1 bit is used to indicate whether to release the corresponding uplink resource, and the other 1 bit is used to indicate whether to disable the corresponding uplink resource. The 1 bit used to indicate whether to release the corresponding uplink resource is mainly described herein. For example, if a value of the 1 bit is "1", it indicates that the first information indicates to release all the uplink resources that are configured by the network device and that are used by the terminal device to perform uplink transmission in idle mode; or if a value of the 1 bit is "0", it indicates that the first information indicates not to release all the uplink resources that are configured by the network device and that are used by the terminal device to perform uplink transmission in idle mode. Alternatively, if the 1 bit needs to be used to indicate only "release", the value of the 1 bit may be irrelevant. Provided that the network device sends the first information of the 1 bit, regardless of whether the value of the first information of the 1 bit is "0" or "1", it indicates that the network device indicates to release all the uplink resources that are configured by the network device and that are used by the terminal device to perform uplink transmission in idle mode. If the network device does not send the first information, it indicates that all the uplink resources that are configured by the network device and that are used by the terminal device to perform uplink transmission in idle mode are not released.

Next, the 1 bit used to indicate whether to disable the corresponding uplink resource is described. If the 1 bit is used to indicate "disable", for example, if a value of the 1 bit is "1", it indicates that the network device indicates to disable all the uplink resources that are configured by the network device and that are used by the terminal device to perform uplink transmission in idle mode; or if a value of the 1 bit is "0", it indicates that the network device indicates not to disable all the uplink resources that are configured by the network device and that are used by the terminal device to perform uplink transmission in idle mode. Alternatively, if the 1 bit needs to be used to indicate only "disable", the value of the 1 bit may be irrelevant. Provided that the network device sends the first information of the 1 bit, regardless of whether the value of the first information of the 1 bit is "0" or "1", it indicates that the network device indicates to disable all the uplink resources that are configured by the network device and that are used by the terminal device to perform uplink transmission in idle mode. If the network device does not send the first information, it indicates that all the uplink resources that are configured by the network device and that are used by the terminal device to perform uplink transmission in idle mode are not disabled.

Alternatively, if the one or more uplink resources include all the uplink resources that are configured by the network device and that are used by the terminal device to perform uplink transmission in idle mode, the first information may not be implemented in a form of 1 bit, but may include an index of a corresponding uplink resource. For example, the first information may include at least one first index. This indicates that the network device indicates to release the at least one uplink resource corresponding to the at least one first index. For example, after receiving the first information, as long as determining that the first index corresponding to the first uplink resource configured by the network device for the first terminal device is included in the first information, the first terminal device may release the first uplink resource. Certainly, the first terminal device releases an uplink resource corresponding to the first index in the first uplink resource. The uplink resource corresponding to the first index in the first uplink resource may include a part or all of the first uplink resource. For example, if the network device configures first indexes for all the uplink resources that are configured by the network device and that are used by the terminal device to perform uplink transmission in idle mode, the first information needs to carry only a first index of a corresponding uplink resource. This indicates that the network device indicates to release the uplink resource. If the first information carries the first indexes of all the uplink resources that are configured by the network device and that are used by the terminal device to perform uplink transmission in idle mode, it indicates that the network device indicates to release all the uplink resources that are configured by the network device and that are used by the terminal device to perform uplink transmission in idle mode.

For another example, if the network device configures second indexes for all the uplink resources that are configured by the network device and that are used by the terminal device to perform uplink transmission in idle mode, the first information needs to carry only a second index of a corresponding uplink resource. This indicates that the network device indicates to disable the uplink resource. If the first information carries the second indexes of all the uplink resources that are configured by the network device and that are used by the terminal device to perform uplink transmission in idle mode, it indicates that the network device indicates to disable all the uplink resources that are configured by the network device and that are used by the terminal device to perform uplink transmission in idle mode. For example, after receiving the first information, as long as determining that the second index corresponding to the first uplink resource configured by the network device for the first terminal device is included in the first information, the first terminal device may release the first uplink resource. Certainly, the first terminal device releases an uplink resource corresponding to the second index in the first uplink resource. The uplink resource corresponding to the second index in the first uplink resource may include a part or all of the first uplink resource.

One uplink resource is corresponding to one first index, and different uplink resources may be corresponding to different first indexes. In this case, if the network device needs to indicate, by indicating a first index, to release a corresponding uplink resource, a quantity of first indexes that need to be carried may be relatively large. Alternatively, first indexes corresponding to a plurality of uplink resources may be the same. For example, uplink resources may be classified, a same first index may be configured for uplink resources of a same type, or a same first index may be configured for uplink resources that meet a same condition. For example, if the network device configures a same first index for all the uplink resources that are configured by the network device and that are used by the terminal device to perform uplink transmission in idle mode, the first information needs to carry only one first index, so that the network device can indicate to release all the uplink resources that are configured by the network device and that are used by the terminal device to perform uplink transmission in idle mode. This manner helps reduce transmission resources occupied by the first information, and simplifies a structure of the first information.

Similarly, one uplink resource is corresponding to one second index, and different uplink resources may be corresponding to different second indexes. In this case, if the network device needs to indicate, by indicating a second index, to disable a corresponding uplink resource, a quantity of second indexes that need to be carried may be relatively large. Alternatively, second indexes corresponding to a plurality of uplink resources may be the same. For example, uplink resources may be classified, a same second index may be configured for uplink resources of a same type, or a same second index may be configured for uplink resources that meet a same condition. For example, if the network device configures a same second index for all the uplink resources that are configured by the network device and that are used by the terminal device to perform uplink transmission in idle mode, the first information needs to carry only one second index, so that the network device can indicate to disable all the uplink resources that are configured by the network device and that are used by the terminal device to perform uplink transmission in idle mode. This manner helps reduce transmission resources occupied by the first information, and simplifies a structure of the first information.

Alternatively, if all the uplink resources that are configured by the network device and that are used by the terminal device to perform uplink transmission in idle mode can meet a same condition, for example, referred to as a first condition, the first information may also carry the first condition, indicating that the network device indicates to release the uplink resources that meet the first condition. However, if all the uplink resources that are configured by the network device and that are used by the terminal device to perform uplink transmission in idle mode can meet the first condition, and the first information carries the first condition, it indicates that the first information indicates to release all the uplink resources that are configured by the network device and that are used by the terminal device to perform uplink transmission in idle mode. For example, after receiving the first information, as long as determining that the first uplink resource configured by the network device for the first terminal device meets the first condition, the first terminal device may release the first uplink resource. Certainly, the first terminal device releases an uplink resource meeting the first condition in the first uplink resource. The uplink resource meeting the first condition in the first uplink resource may include a part or all of the first uplink resource.

The first condition includes, for example, that a transport block size is greater than (or equal to) a first threshold, and/or that a quantity of times of repeated transmission of one piece of data is greater than (or equal to) a second threshold. Certainly, the first condition may further include another condition, which is not specifically limited. For example, if a transport block size corresponding to an uplink resource is greater than or equal to the first threshold, or a specified quantity of times of repeated transmission of one piece of data is greater than or equal to the second threshold, it indicates that there is a relatively large quantity of uplink resources, and release of such uplink resources is helpful for other transmission.

Similarly, if all the uplink resources that are configured by the network device and that are used by the terminal device to perform uplink transmission in idle mode can meet a same condition, for example, referred to as a second condition, the first information may also carry the second condition, indicating that the network device indicates to disable the uplink resources that meet the second condition. However, if all the uplink resources that are configured by the network device and that are used by the terminal device to perform uplink transmission in idle mode can meet the second condition, and the first information carries the second condition, it indicates that the first information indicates to disable all the uplink resources that are configured by the network device and that are used by the terminal device to perform uplink transmission in idle mode. For example, after receiving the first information, as long as determining that the first uplink resource configured by the network device for the first terminal device meets the second condition, the first terminal device may release the first uplink resource. Certainly, the first terminal device releases an uplink resource meeting the second condition in the first uplink resource. The uplink resource meeting the second condition in the first uplink resource may include a part or all of the first uplink resource. For example, if a transport block size corresponding to an uplink resource is greater than or equal to the first threshold, or a specified quantity of times of repeated transmission of one piece of data is greater than or equal to the second threshold, it indicates that there is a relatively large quantity of uplink resources, and release of such uplink resources is helpful for other transmission.

The first condition and the second condition may be a same condition, or may be different conditions. For example, both the first condition and the second condition are that the transport block size is greater than (or equal to) the first threshold. Alternatively, the first condition is that the transport block size is greater than (or equal to) the first threshold, and the second condition is that the quantity of times of repeated transmission of one piece of data is greater than (or equal to) the second threshold.

In an optional implementation in which the network device determines to release or disable the one or more uplink resources, the one or more uplink resources may include a part of the uplink resources that are configured by the network device and that are used by the terminal device to perform uplink transmission in idle mode. That is, the network device may configure at least one uplink resource for one or more terminal devices covered by the network device in a PUR manner. In this case, the at least one uplink resource may include a part of all the uplink resources configured by the network device for the terminal devices. For example, when the network load is relatively heavy or network resources are relatively insufficient, the network device may determine to release or disable a part of the uplink resources that are configured by the network device and that are used by the terminal device to perform uplink transmission in idle mode, so that these resources can be withdrawn for corresponding transmission. In addition, efforts are made to ensure that another terminal device for which an uplink resource is configured can continue to use the configured uplink resource.

If the one or more uplink resources include a part of the uplink resources that are configured by the network device and that are used by the terminal device to perform uplink transmission in idle mode, the first information may include an index of a corresponding uplink resource. For example, the first information may include at least one first index. In other words, it indicates that the network device indicates to release at least one uplink resource corresponding to at least one first index. For example, if the network device configures a first index for all or a part of the uplink resources that are configured by the network device and used by the terminal device to perform uplink transmission in idle mode, the first information needs to carry only a first index of a corresponding uplink resource, indicating that the network device indicates to release the uplink resource. In this case, the network device may carry a first index of an uplink resource that needs to be released. For example, after receiving the first information, if determining that the first index corresponding to the first uplink resource configured by the network device for the first terminal device is included in the first information, the first terminal device may release the first uplink resource. Certainly, the first terminal device releases an uplink resource corresponding to the first index in the first uplink resource, and the uplink resource corresponding to the first index in the first uplink resource may include a part or all of the first uplink resource.

For another example, if the network device configures a second index for all or a part of the uplink resources that are configured by the network device and used by the terminal device to perform uplink transmission in idle mode, the first information needs to carry only a second index of a corresponding uplink resource, indicating that the network device indicates to disable the uplink resource. In this case, the network device may carry a second index of an uplink resource that needs to be released. This manner is relatively simple and clear. The terminal device may determine, based on the first index carried in the first information, whether to release the uplink resource preconfigured by the network device for the terminal device, or may determine, based on the second index carried in the first information, whether to disable the uplink resource of the terminal device. For example, after receiving the first information, if determining that the second index corresponding to the first uplink resource configured by the network device for the first terminal device is included in the first information, the first terminal device may release the first uplink resource. Certainly, the first terminal device releases an uplink resource corresponding to the second index in the first uplink resource, and the uplink resource corresponding to the second index in the first uplink resource may include a part or all of the first uplink resource.

The implementation of the first index has been described above. For example, different uplink resources may be respectively corresponding to different first indexes. In this case, the network device needs to carry first indexes respectively corresponding to uplink resources that need to be released. Alternatively, a plurality of uplink resources may be corresponding to a same first index, and the network device needs to carry only one first index to indicate to release the plurality of uplink resources, thereby saving transmission resources. Similarly, the implementation of the second index has also been described above. For example, different uplink resources may be respectively corresponding to different second indexes. In this case, the network device needs to carry second indexes respectively corresponding to uplink resources that need to be released. Alternatively, a plurality of uplink resources may be corresponding to a same second index, and the network device needs to carry only one second index to indicate to release the plurality of uplink resources, thereby saving transmission resources.

Alternatively, if the network device needs to indicate to release a part of the uplink resources that are configured by the network device and that are used by the terminal device to perform uplink transmission in idle mode, the first information may alternatively carry a first condition, indicating that the network device indicates to release an uplink resource that meets the first condition. For example, after receiving the first information, as long as determining that the first uplink resource configured by the network device for the first terminal device meets the first condition, the first terminal device may release the first uplink resource. Certainly, the first terminal device releases an uplink resource meeting the first condition in the first uplink resource, and the uplink resource meeting the first condition in the first uplink resource may include a part or all of the first uplink resource.

Similarly, if the network device needs to indicate to disable a part of the uplink resources that are configured by the network device and that are used by the terminal device to perform uplink transmission in idle mode, the first information may alternatively carry a second condition, indicating that the network device indicates to disable an uplink resource that meets the second condition. For example, after receiving the first information, as long as determining that the first uplink resource configured by the network device for the first terminal device meets the second condition, the first terminal device may disable the first uplink resource. Certainly, the first terminal device disables an uplink resource meeting the second condition in the first uplink resource, and the uplink resource meeting the second condition in the first uplink resource may include a part or all of the first uplink resource.

The first condition and the second condition have been described above.

That the network device indicates, by using the first information, to release or disable a part or all of the one or more uplink resources has been described above. The following describes how the network device indicates, by using the first information, to modify a part or all of the one or more uplink resources.

If the one or more uplink resources include all the uplink resources that are configured by the network device and that are used by the terminal device to perform uplink transmission in idle mode, first information used by the network device to indicate to modify a part or all of the one or more uplink resources may include 1 bit. For example, if a value of the 1 bit is "1", it indicates that the first information indicates to modify all the uplink resources that are configured by the network device and that are used by the terminal device to perform uplink transmission in idle mode; or if a value of the 1 bit is "0", it indicates that the first information indicates not to modify all the uplink resources that are configured by the network device and that are used by the terminal device to perform uplink transmission in idle mode.

Alternatively, if the 1 bit is used to indicate only "modify", the value of the 1 bit may be irrelevant. Provided that the network device sends the first information of the 1 bit, regardless of whether the value of the first information of the 1 bit is "0" or "1", it indicates that the network device indicates to modify all the uplink resources that are configured by the network device and that are used by the terminal device to perform uplink transmission in idle mode. If the network device does not send the first information, it indicates that all the uplink resources that are configured by the network device and that are used by the terminal device to perform uplink transmission in idle mode are not modified.

Alternatively, a position of the 1 bit may be used for indication. If the first information of the 1 bit is located in the MIB, it indicates that the first information indicates to modify all the uplink resources that are configured by the network device and that are used by the terminal device to perform uplink transmission in idle mode. If the MIB does not include the first information of the 1 bit, that is, the network device does not send the first information of the 1 bit, it indicates that all the uplink resources that are configured by the network device and that are used by the terminal device to perform uplink transmission in idle mode are not modified.

Certainly, when the first information includes only 1 bit, if the first information indicates to modify all the uplink resources that are configured by the network device and that are used by the terminal device to perform uplink transmission in idle mode, information about a specific modification manner may be indicated by the network device by using other information, or may be specified in a protocol.

Alternatively, if the one or more uplink resources include all the uplink resources that are configured by the network device and that are used by the terminal device to perform uplink transmission in idle mode, the first information may not be implemented in a form of 1 bit, but may include an index of a corresponding uplink resource. For example, the first information may include at least one third index. This indicates that the network device indicates to modify at least one uplink resource corresponding to the at least one third index. For example, after receiving the first information, as long as determining that the third index corresponding to the first uplink resource configured by the network device for the first terminal device is included in the first information, the first terminal device may modify the first uplink resource. Certainly, the first terminal device modifies an uplink resource corresponding to the third index in the first uplink resource. The uplink resource corresponding to the third index in the first uplink resource may include a part or all of the first uplink resource. The information about the specific modification manner may be included in the first information. The first terminal device may determine, based on the first information, whether the first uplink resource needs to be modified and how to modify the first uplink resource. Alternatively, the network device may send the information about the specific modification manner by using other information. Alternatively, the information about the modification manner may be specified in a protocol.

Similarly, one uplink resource is corresponding to one third index, and different uplink resources may be corresponding to different third indexes. In this case, if the network device needs to indicate, by indicating a third index, to modify a corresponding uplink resource, a quantity of third indexes that need to be carried may be relatively large. Alternatively, third indexes corresponding to a plurality of uplink resources may be the same. For example, uplink resources may be classified, a same first index may be configured for uplink resources of a same type, or a same third index may be configured for uplink resources that meet a same condition. For example, if the network device configures a same third index for all the uplink resources that are configured by the network device and that are used by the terminal device to perform uplink transmission in idle mode, the first information needs to carry only one third index, so that the network device can indicate to modify all the uplink resources that are configured by the network device and that are used by the terminal device to perform uplink transmission in idle mode. This manner helps reduce transmission resources occupied by the first information, and simplifies a structure of the first information.

Alternatively, if all the uplink resources that are configured by the network device and that are used by the terminal device to perform uplink transmission in idle mode can meet a same condition, for example, referred to as a third condition, the first information may also carry the third condition, indicating that the network device indicates to modify the uplink resources that meet the third condition. However, if all the uplink resources that are configured by the network device and that are used by the terminal device to perform uplink transmission in idle mode can meet the third condition, and the first information carries the third condition, it indicates that the first information indicates to modify all the uplink resources that are configured by the network device and that are used by the terminal device to perform uplink transmission in idle mode. For example, after receiving the first information, as long as determining that the first uplink resource configured by the network device for the first terminal device meets the third condition, the first terminal device may modify the first uplink resource. Certainly, the first terminal device modifies an uplink resource meeting the third condition in the first uplink resource. The uplink resource meeting the third condition in the first uplink resource may include a part or all of the first uplink resource. The information about the specific modification manner may be included in the first information. The first terminal device may determine, based on the first information, whether the first uplink resource needs to be modified and how to modify the first uplink resource. Alternatively, the network device may send the information about the specific modification manner by using other information. Alternatively, the information about the modification manner may be specified in a protocol.

The third condition includes, for example, that a transport block size is greater than (or equal to) a first threshold, and/or that a quantity of times of repeated transmission of one piece of data is greater than (or equal to) a second threshold. Certainly, the third condition may further include another condition, which is not specifically limited. For example, the third condition includes a condition that the transport block size is greater than (or equal to) the first threshold. If a transport block size corresponding to an uplink resource is greater than (or equal to) the first threshold, it indicates that there are a relatively large quantity of uplink resources. In this case, the network device may indicate, by using the first information, to modify the uplink resource, for example, may shorten a validity period of the uplink resource, may reduce a bandwidth of the uplink resource, or may reduce the transport block size corresponding to the uplink resource. In these manners, the uplink resource may be reduced, so that a part of the uplink resources may be allocated for other transmission.

The first condition, the second condition, and the third condition may be the same or may be different, or any two of the conditions may be the same but the other one condition is different.

If the one or more uplink resources include a part of the uplink resources that are configured by the network device and that are used by the terminal device to perform uplink transmission in idle mode, the first information may include an index of a corresponding uplink resource. For example, the first information may include at least one third index. This indicates that the network device indicates to modify at least one uplink resource corresponding to the at least one third index. For example, after receiving the first information, as long as determining that the third index corresponding to the first uplink resource configured by the network device for the first terminal device is included in the first information, the first terminal device may modify the first uplink resource. Certainly, the first terminal device modifies an uplink resource corresponding to the third index in the first uplink resource. The uplink resource corresponding to the third index in the first uplink resource may include a part or all of the first uplink resource. The information about the specific modification manner may be included in the first information. The first terminal device may determine, based on the first information, whether the first uplink resource needs to be modified and how to modify the first uplink resource. Alternatively, the network device may send the information about the specific modification manner by using other information. Alternatively, the information about the modification manner may be specified in a protocol.

Alternatively, if the one or more uplink resources include a part of the uplink resources that are configured by the network device and that are used by the terminal device to perform uplink transmission in idle mode, the first information may alternatively carry a third condition, indicating that the network device indicates to modify an uplink resource that meets the third condition. For example, after receiving the first information, as long as determining that the first uplink resource configured by the network device for the first terminal device meets the third condition, the first terminal device may modify the first uplink resource. Certainly, the first terminal device modifies an uplink resource meeting the third condition in the first uplink resource. The uplink resource meeting the third condition in the first uplink resource may include a part or all of the first uplink resource. The information about the specific modification manner may be included in the first information. The first terminal device may determine, based on the first information, whether the first uplink resource needs to be modified and how to modify the first uplink resource. Alternatively, the network device may send the information about the specific modification manner by using other information. Alternatively, the information about the modification manner may be specified in a protocol.

In addition, as described in this embodiment of this application, if sending the first information by using a broadcast message, the network device may include the first information in a broadcast message for broadcasting, for example, include the first information in a MIB or a SIB. For example, if the network device needs to indicate to release all the uplink resources that are configured by the network device and that are used by the terminal device to perform uplink transmission in idle mode, and the first information is implemented by using 1 bit, space occupied by the first information is relatively small, and may be included in the MIB or the SIB.

Alternatively, the network device may include the first information in at least two broadcast messages for broadcasting. For example, one or more bits may be used in the MIB to indicate whether a resource release and/or disabling function is enabled, and the first information is carried in the SIB.

For example, the first information is implemented by using 1 bit. In this case, one or more bits may be used in the MIB to indicate whether the resource release and/or disabling function is enabled, and the first information of 1 bit is carried in the SIB. It should be noted that a value tag (ValueTag) in the MIB usually varies as the SIB varies, so that the terminal device may determine, by checking the ValueTag in the MIB, whether to update or read another SIB. If one or more bits are used in the MIB to indicate whether the resource release and/or disabling function is enabled, the first information, as a part of the SIB, may not affect a change of the ValueTag in the MIB. An advantage of this is to prevent another terminal device for which the uplink resource is not configured from updating a system message due to release and/or disabling of the uplink resource.

Alternatively, if the network device includes the first information in at least two broadcast messages for broadcasting, the network device may alternatively include a part of the first information in one broadcast message, and include a remaining part of the first information in the other broadcast message. This case is applicable to a scenario in which the first information includes a relatively large amount of content.

For example, the first information includes at least one first index and/or at least one second index (where if the first information includes the at least one first index and the at least one second index, an uplink resource corresponding to the at least one first index and an uplink resource corresponding to the at least one second index may be different, to avid a case in which the terminal device may fail to perform execution for a same uplink resource if both "release" and "disable" are indicated), a part of content included in the first information may be located in a MIB, and a remaining part of the content included in the first information may be located in a SIB. For example, if the first information includes the at least one first index, a part of the at least one first index included in the first information may be located in the MIB, and a remaining part of the at least one first index included in the first information may be located in the SIB. Alternatively, if the first information includes the at least one second index, a part of the at least one second index included in the first information may be located in the MIB, and a remaining part of the at least one second index included in the first information may be located in the SIB. Alternatively, if the first information includes the at least one first index and the at least one second index, the at least one first index included in the first information may be located in the MIB, and the at least one second index included in the first information may be located in the SIB. Alternatively, the first information includes a first indication, used to indicate whether to release or disable all uplink resources, and the first indication may be located in the MIB. The at least one first index and the at least one second index are located in the SIB. In this implementation, if the network device releases or disables all the uplink resources, only the first indication in the MIB is sent. If releasing or disabling a part of the uplink resources, the network device further performs indication by using the SIB.

Alternatively, the first information includes a first condition and/or a second condition (where if the first information includes the first condition and the second condition, an uplink resource corresponding to the first condition and an uplink resource corresponding to the second condition may be different, to avid a case in which the terminal device may fail to perform execution for a same uplink resource if both "release" and "disable" are indicated), a part of content included in the first information may be located in a MIB, and a remaining part of the content included in the first information may be located in a SIB. For example, if the first information includes the first condition, a part of information in the first condition included in the first information may be located in the MIB, and remaining information in the first condition included in the first information may be located in the SIB. Alternatively, if the first information includes the second condition, a part of information in the second condition included in the first information may be located in the MIB, and remaining information in the second condition included in the first information may be located in the SIB. Alternatively, if the first information includes the first condition and the second condition, the first condition included in the first information may be located in the MIB, and the second condition included in the first information may be located in the SIB.

S34: The first terminal device determines, according to an indication of the first information, whether to release or disable the first uplink resource. The first uplink resource is an uplink resource that is configured by the network device for the first terminal device and that is used by the first terminal device to send the uplink data in idle mode.

After receiving the first information, if the first terminal device determines, according to the indication of the first information, that the first uplink resource configured by the network device for the first terminal device needs to be disabled, the first terminal device may disable the first uplink resource. Alternatively, if determining, according to the indication of the first information, that the first uplink resource configured by the network device for the first terminal device needs to be released, the first terminal device may release the first uplink resource.

For example, if the first information indicates to release all the uplink resources that are configured by the network device and that are used by the terminal device to perform uplink transmission in idle mode, the terminal device may determine, based on the first information, that the first uplink resource needs to be released. Alternatively, if the first information indicates to disable all the uplink resources that are configured by the network device and that are used by the terminal device to perform uplink transmission in idle mode, the terminal device may determine, based on the first information, that the first uplink resource needs to be disabled.

Alternatively, if the first information includes at least one first index, the terminal device determines whether the first index corresponding to the first uplink resource belongs to the at least one first index; and if the first index corresponding to the first uplink resource belongs to the at least one first index, the terminal device determines that the first uplink resource needs to be released. Alternatively, if the first information includes at least one second index, the terminal device determines whether the second index corresponding to the first uplink resource belongs to the at least one second index; and if the second index corresponding to the first uplink resource belongs to the at least one second index, the terminal device determines that the first uplink resource needs to be disabled. Certainly, that the first index corresponding to the first uplink resource belongs to the at least one first index may be understood that an uplink resource corresponding to a first index belonging to the at least one first index may be a part or all of the first uplink resource; that the second index corresponding to the first uplink resource belongs to the at least one second index may be understood that an uplink resource corresponding to a second index belonging to the at least one second index may be a part or all of the first uplink resource.

Alternatively, if the first information includes the first condition, the terminal device determines whether the first uplink resource meets the first condition; and if the first uplink resource meets the first condition, the terminal device determines that the first uplink resource needs to be released. Alternatively, if the first information includes the second condition, the terminal device determines whether the first uplink resource meets the second condition; and if the first uplink resource meets the second condition, the terminal device determines that the first uplink resource needs to be disabled. Certainly, that the first uplink resource meets the first condition may be understood as that an uplink resource that meets the first condition may be a part or all of the first uplink resource; that the first uplink resource meets the second condition may be understood that an uplink resource that meets the second condition may be a part or all of the first uplink resource.

After the terminal device determines to release the first uplink resource, the terminal device may release the first uplink resource, to avoid sending the uplink data by using the first uplink resource. Alternatively, after the terminal device determines to disable the first uplink resource, the terminal device may disable the first uplink resource, to avoid sending the uplink data by using the first uplink resource.

Certainly, if the network device disables the first uplink resource, the first uplink resource may be further enabled subsequently. For example, the network device may preconfigure first duration, the network device may indicate first duration when disabling the first uplink resource, or first duration may be specified in a protocol. The terminal device may start a timer when disabling the first uplink resource, where timing duration of the timer is the first duration. Within the first duration, the terminal device disables the first uplink resource. When the timer expires, the terminal device can enable the first uplink resource again. Alternatively, after disabling the first uplink resource, if the network device determines that the terminal device can re-enable the first uplink resource, the network device may send information again. For example, the network device sends third information, where the third information is used to indicate to re-enable the at least one uplink resource. The at least one uplink resource may be configured for the one or more terminal devices. After receiving the third information, if determining that the first uplink resource belongs to the at least one uplink resource, the first terminal device may re-enable the first uplink resource. For example, the third information may be sent in a system message, or sent in a paging manner. No specific limitation is imposed.

After releasing or disabling the first uplink resource, the terminal device may not send the uplink data, or may send the uplink data in another manner. For example, the uplink data may be sent in an EDT manner. In this case, the terminal device may skip two steps of Msg1 and Msg2 in a random access procedure, and directly send Msg3 to the network device, where the uplink data is carried by using the Msg3. Alternatively, the terminal device may send the uplink data to the network device in a random access manner after accessing the network device.

Alternatively, the terminal device may further determine, based on the first information, not to release and/or disable the first uplink resource.

For example, if the first information includes the at least one first index, the terminal device determines whether the first index corresponding to the first uplink resource belongs to the at least one first index; if a first index corresponding to an uplink resource in the first uplink resource does not belong to the at least one first index, the terminal device determines that the uplink resource does not need to be released; and/or if the first information includes the at least one second index, the terminal device determines whether the second index corresponding to the first uplink resource belongs to the at least one second index; if a second index corresponding to an uplink resource in the first uplink resource does not belong to the at least one second index, the terminal device determines that the uplink resource does not need to be disabled. The uplink resource that is in the first uplink resource and whose corresponding first index does not belong to the at least one first index may be a part or all of the first uplink resource; and uplink resource that is in the first uplink resource and whose corresponding second index does not belong to the at least one second index may be a part or all of the first uplink resource.

Alternatively, if the first information includes the first condition, the terminal device determines whether the first uplink resource meets the first condition; and if an uplink resource in the first uplink resource does not meet the first condition, the terminal device determines that the uplink resource does not need to be released. Alternatively, if the first information includes the second condition, the terminal device determines whether the first uplink resource meets the second condition; and if an uplink resource in the first uplink resource does not meet the second condition, the terminal device determines that the uplink resource does not need to be disabled. The uplink resource that does not meet the first condition in the first uplink resource may be a part or all of the first uplink resource. An uplink resource that does not meet the second condition in the first uplink resource may be a part or all of the first uplink resource.

For example, the first condition is that a transport block size is greater than or equal to a first threshold, and the first uplink resource includes two uplink resources, an uplink resource 1 and an uplink resource 2, where a transport block size corresponding to the uplink resource 1 is less than the first threshold, and a transport block size corresponding to the uplink resource 2 is greater than the first threshold. The first terminal device may determine that the uplink resource 2 in the first uplink resource meets the first condition and needs to be released, and the uplink resource 1 does not meet the first condition and does not need to be released.

If the network device indicates to only release an uplink resource, if the terminal device determines that a part or all of the first uplink resource does not need to be released, the terminal device may continue to send uplink data to the network device by using an unreleased uplink resource in the first uplink resource. Alternatively, if the network device indicates to only disable an uplink resource, if the terminal device determines that a part or all of the first uplink resource does not need to be disabled, the terminal device may continue to send uplink data to the network device by using an unreleased uplink resource in the first uplink resource. Alternatively, if the network device indicates to release and disable a corresponding uplink resource, if the terminal device determines that a part or all of the first uplink resource neither needs to be released nor needs to be disabled, the terminal device may continue to send uplink data to the network device by using an uplink resource that is neither released nor disabled in the first uplink resource.

For example, the first information sent by the network device includes the at least one first index and the at least one second index. The at least one first index is used to indicate to release at least one corresponding uplink resource, and the at least one second index is used to indicate to release at least one corresponding uplink resource (which may be different from the at least one uplink resource corresponding to the at least one first index). In this case, the network device indicates both "release" and "disable". The first uplink resource includes four uplink resources, which are respectively an uplink resource 1, an uplink resource 2, an uplink resource 3, and an uplink resource 4. The terminal device determines that a first index corresponding to the uplink resource 1 belongs to the at least one first index, but a first index corresponding to the uplink resource 2, a first index corresponding to the uplink resource 3, and a first index corresponding to the uplink resource 4 all do not belong to the at least one first index, and determines that a second index corresponding to the uplink resource 2 and a second index corresponding to the uplink resource 4 belong to the at least one second index, but neither a second index corresponding to the uplink resource 1 nor a second index corresponding to the uplink resource 3 belongs to the at least one second index. In this case, the network device determines that the uplink resource 1 needs to be released, the uplink resource 2 and the uplink resource 4 need to be disabled, and the uplink resource 3 neither needs to be released nor needs to be disabled. In this case, the terminal device may continue to send uplink data to the network device by using the uplink resource 3.

If the terminal device continues to send uplink data to the network device by using a part or all of the first uplink resource, the first terminal device may monitor the PDCCH and the like after sending the uplink data. For a specific process, refer to descriptions of S13, S14, and the like in FIG. 1. Details are not described again.

To better understand the technical solutions provided in the embodiments of this application, refer to the following FIG. 4, FIG. 5A, FIG. 5B, FIG. 6A, and FIG. 6B. The resource management method provided in the embodiments of this application may be relatively completely described by using examples shown in these accompanying drawings. In the example in FIG. 4, an example in which a network device sends first information in a broadcast manner is used. In the two examples in FIG. 5A, FIG. 5B, FIG. 6A, and FIG. 6B, an example in which a network device sends first information in a paging manner is used. In addition, in FIG. 5A and FIG. 5B, for example, first information is sent by using DCI used to schedule a paging message or by using a paging message; in FIG. 6A and FIG. 6B, for example, first information is sent by using DCI scrambled by a first RNTI or by using a PDSCH scrambled by a first RNTI.

Figure 4:
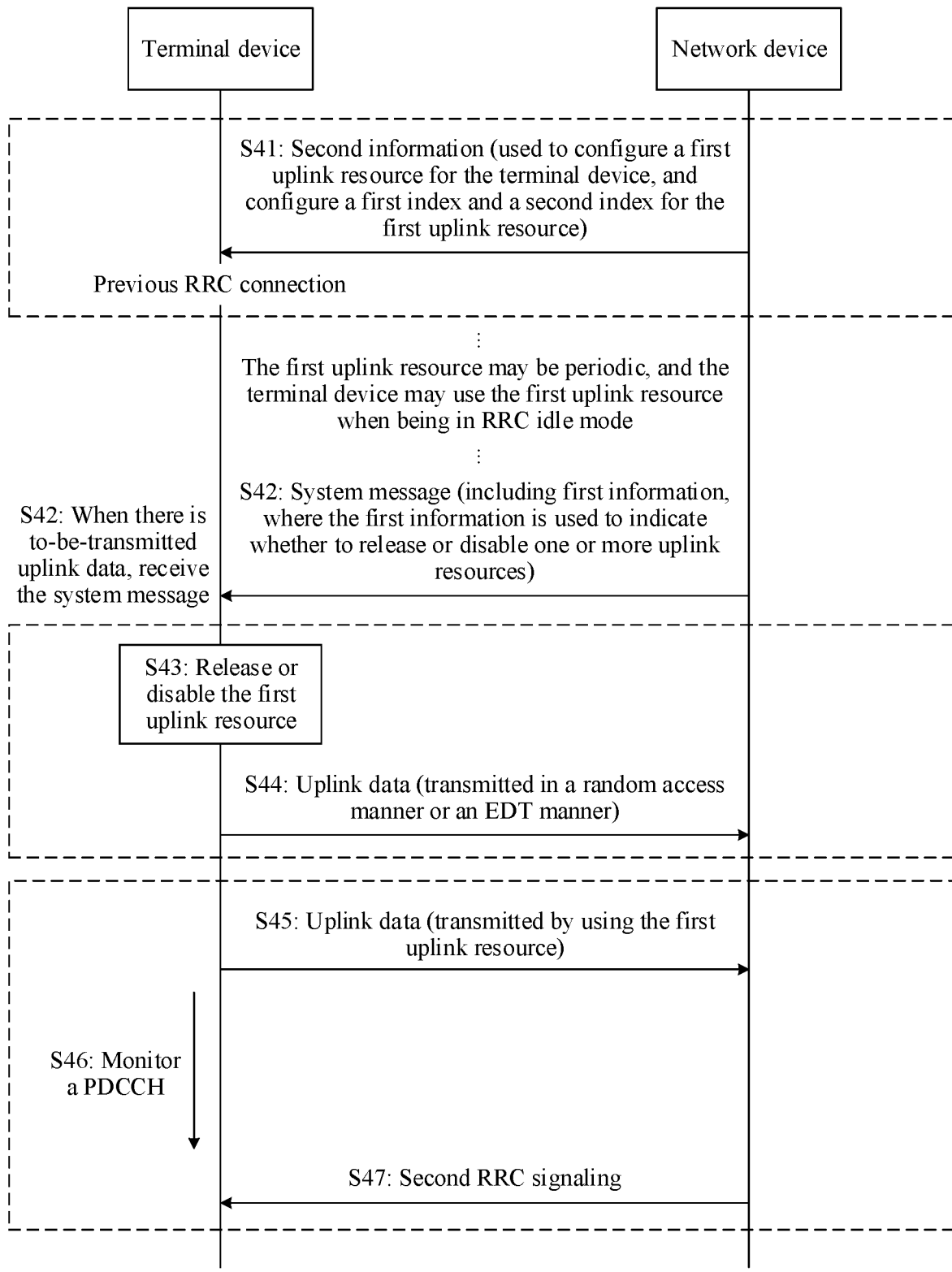
FIG. 4 is a first type of detailed flowchart of a resource management method according to an embodiment of this application.

As shown in FIG. 4, in an RRC connection between a first terminal device and a network device, S41 is that the network device sends second information to the first terminal device, and the terminal device receives the second information from the network device. The second information is used to configure a first uplink resource for the first terminal device. In addition, in FIG. 4, for example, the second information is further used to configure a first index and a second index for the first terminal device. The first uplink resource may be periodic, and the first terminal device may use the first uplink resource when being in RRC idle mode.

S42: If determining to release or disable one or more uplink resources, the network device sends first information. In FIG. 4, for example, the network device sends the first information by using a system message, where the first information is used to indicate whether to release or disable the one or more uplink resources. For the first terminal device, S42 is that the first terminal device receives (or detects) the system message when there is to-be-transmitted uplink data.

S43: If the first terminal device determines, based on the first information included in the system message, that the first uplink resource needs to be released or disabled, the first terminal device releases or disables the first uplink resource. In addition, S44 is further included: If the first terminal device releases or disables the first uplink resource, the first terminal device may not send the uplink data, or may send the uplink data in a manner such as random access or EDT.

As a solution parallel with S43, S45 is as follows: If the first terminal device determines, based on the first information included in the system message, that the first uplink resource neither needs to be released nor needs to be disabled, the first terminal device sends the uplink data by using the first uplink resource.

S46: The first terminal device monitors a PDCCH.

S47: After receiving the uplink data, the network device sends the terminal device RRC signaling, for example, referred to as second RRC signaling, and the terminal device receives the second RRC signaling from the network device.

For S45 to S47, refer to descriptions of S12 to S14 in the embodiment shown in FIG. 1.

Figure 5A:
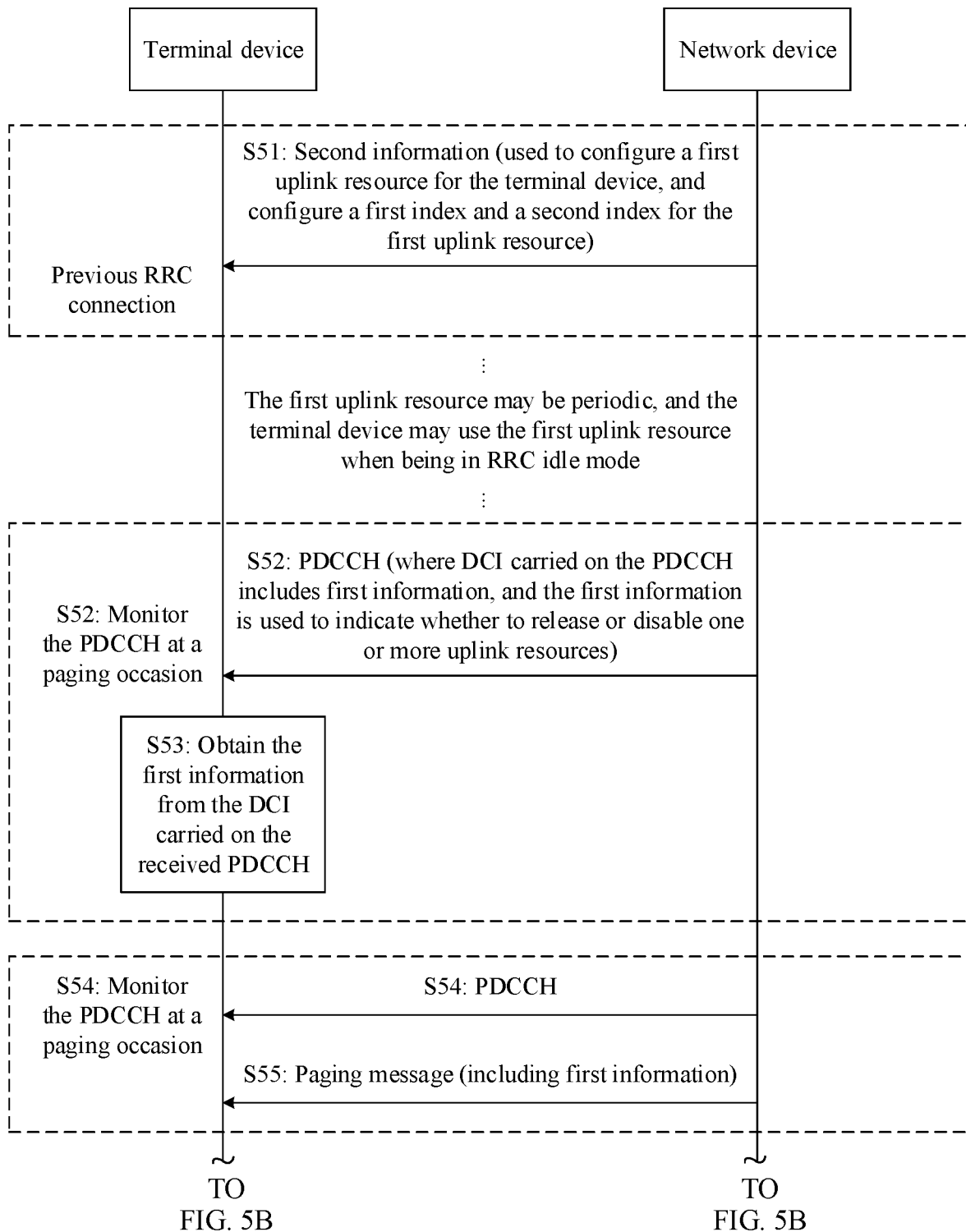
FIG. 5A and FIG. 5B are a second type of detailed flowchart of a resource management method according to an embodiment of this application.
Figure 5B:
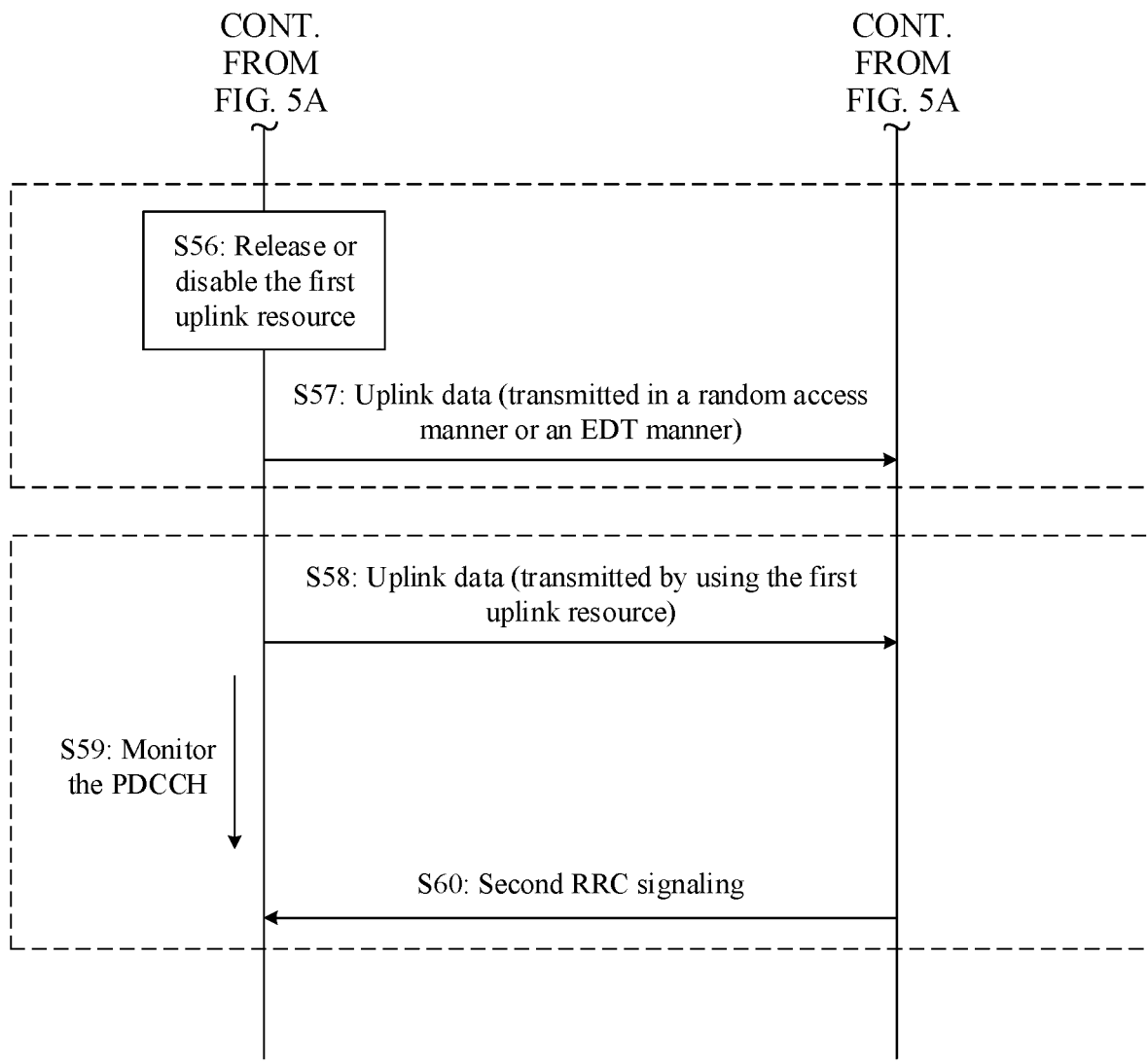

As shown in FIG. 5A and FIG. 5B, in an RRC connection between a first terminal device and a network device, S51 is that the network device sends second information to the first terminal device, and the terminal device receives the second information from the network device. The second information is used to configure a first uplink resource for the first terminal device. In addition, in FIG. 5A and FIG. 5B, for example, the second information is further used to configure a first index and a second index for the first terminal device. The first uplink resource may be periodic, and the first terminal device may use the first uplink resource when being in RRC idle mode.

Next, if determining to release or disable one or more uplink resources, the network device sends first information. In FIG. 5A and FIG. 5B, for example, the network device sends the first information in a paging manner. In addition, when the network device sends the first information in the paging manner, the network device may send the first information in DCI used to schedule a paging message, or may send the first information in DCI. S52 and S53 are described subsequently by using an example in which the network device sends the first information in the DCI. S54 and S55 are described by using an example in which the network device sends the first information in a paging message. It may be understood that S52 and S53, and S54 and S55 are two optional implementations, and the network device may select one of the two implementations. A specific implementation to be selected may be determined by the network device and notified to the terminal device, or may be specified in a protocol.

S52: The network device includes the first information in the DCI, and sends, at a paging occasion, a PDCCH carrying the DCI, where the first information is used to indicate whether to release or disable the one or more uplink resources, and the DCI is scrambled by a P-RNTI. The first terminal device monitors the PDCCH at the paging occasion.

S53: The first terminal device obtains the first information from the DCI carried on the received PDCCH.

S54: The network device sends the PDCCH at a paging occasion, where the DCI carried on the PDCCH includes scheduling information used to schedule a paging message, and the first terminal device receives the PDCCH at the paging occasion, to obtain the DCI carried on the PDCCH.

S55: The network device sends a paging message based on the scheduling information, where the paging message includes the first information, and the first terminal device receives the paging message from the network device, to obtain the first information included in the paging message.

S56: If the first terminal device determines, based on the first information included in a system message, that the first uplink resource needs to be released or disabled, the first terminal device releases or disables the first uplink resource. In addition, S57 is further included: If the first terminal device releases or disables the first uplink resource, the first terminal device may not send the uplink data, or may send the uplink data in a manner such as random access or EDT.

As a solution parallel with S56, S58 is as follows: If the first terminal device determines, based on the first information included in a system message, that the first uplink resource neither needs to be released nor needs to be disabled, the first terminal device sends the uplink data by using the first uplink resource.

S59: The first terminal device monitors the PDCCH.

S60: After receiving the uplink data, the network device sends the terminal device RRC signaling, for example, referred to as second RRC signaling, and the terminal device receives the second RRC signaling from the network device.

For S59 and S60, refer to descriptions of S12 to S14 in the embodiment shown in FIG. 1.

Figure 6A:
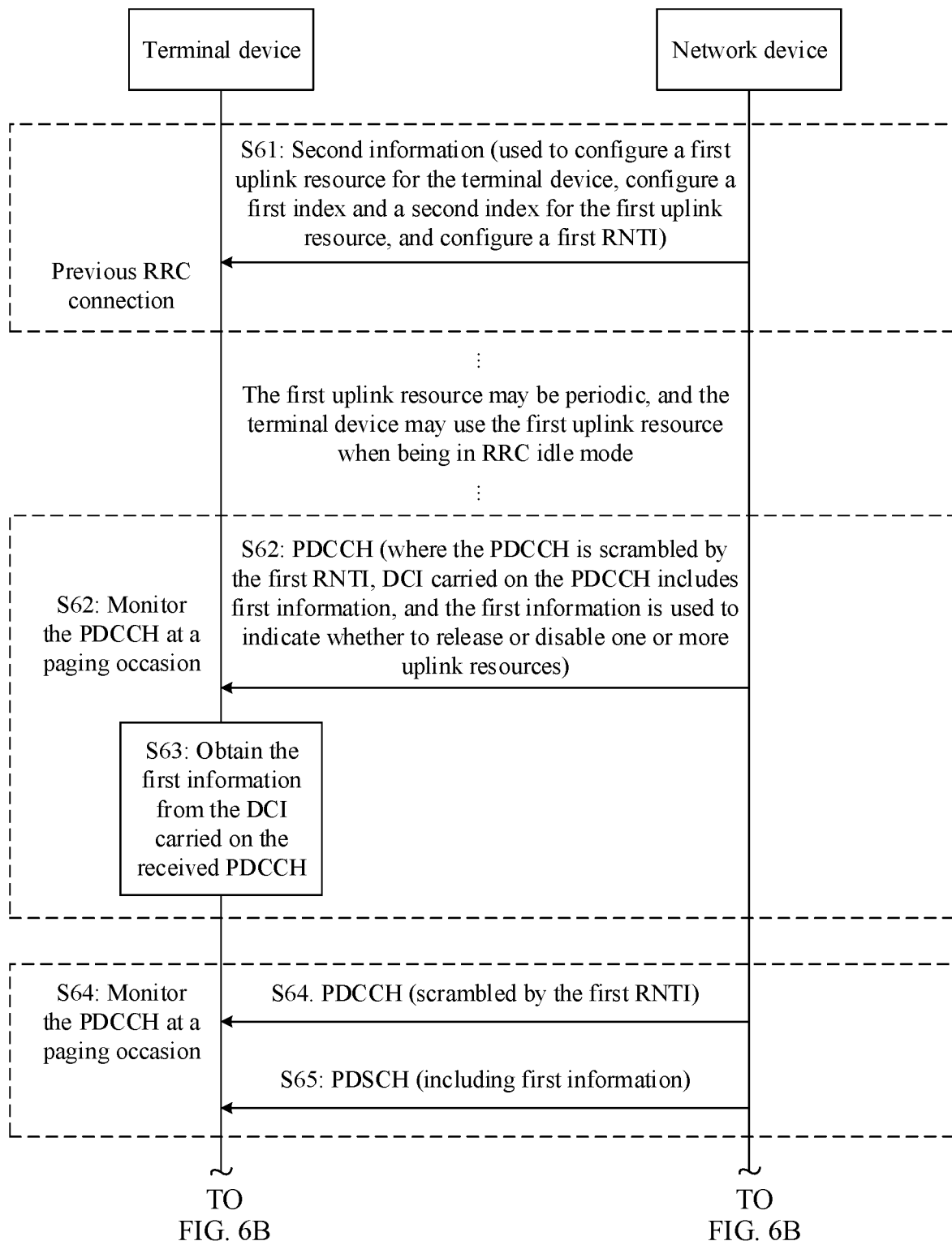
FIG. 6A and FIG. 6B are a third type of detailed flowchart of a resource management method according to an embodiment of this application.
Figure 6B:
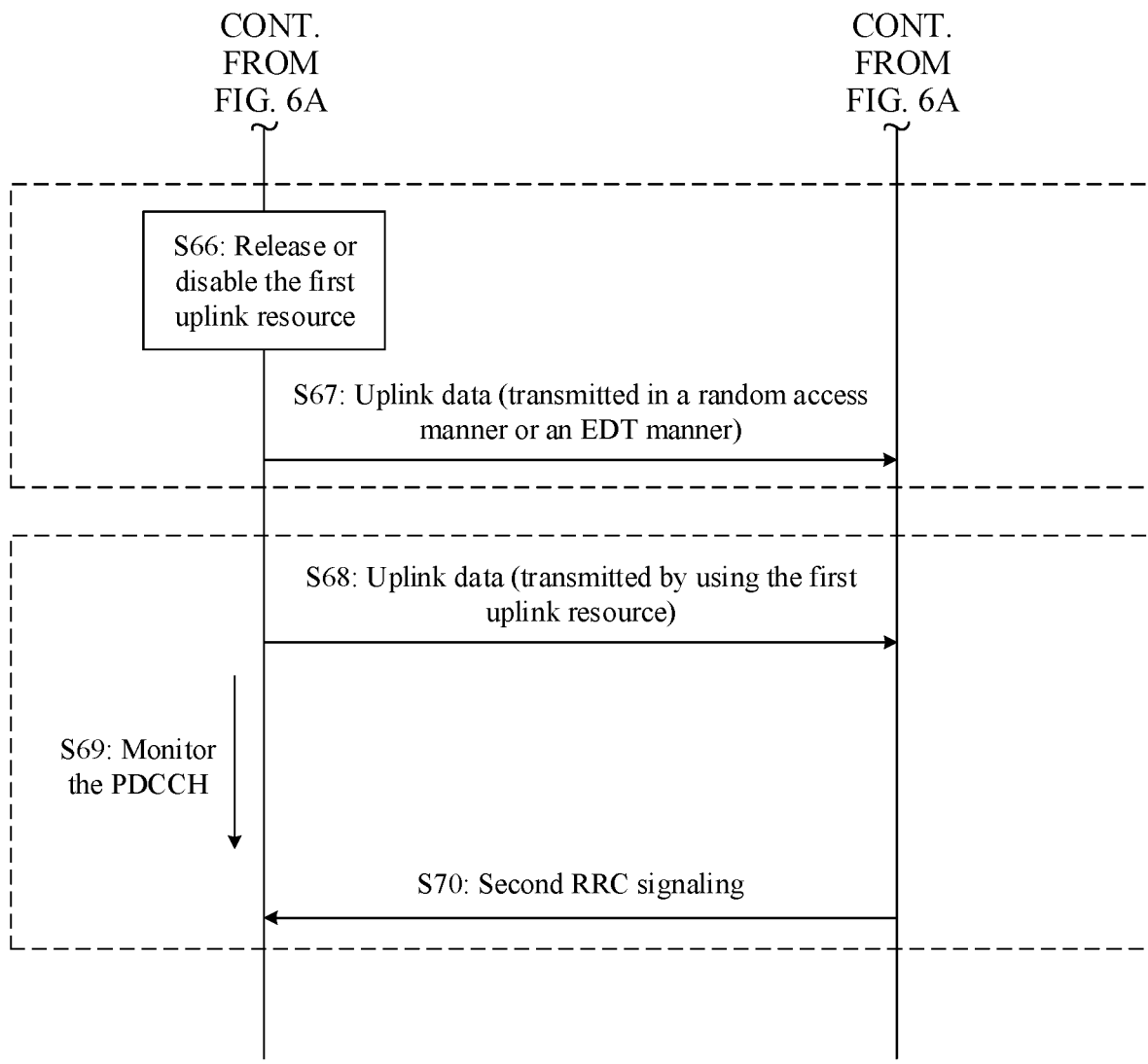

As shown in FIG. 6A and FIG. 6B, in an RRC connection between a first terminal device and a network device, S61 is that the network device sends second information to the first terminal device, and the terminal device receives the second information from the network device. The second information is used to configure a first uplink resource for the first terminal device. In addition, in FIG. 6A and FIG. 6B, for example, the second information is further used to configure a first index and a second index for the first terminal device, and the second information is further used to configure a first RNTI. The first uplink resource may be periodic, and the first terminal device may use the first uplink resource when being in RRC idle mode.

Next, if determining to release or disable one or more uplink resources, the network device sends first information. In FIG. 6A and FIG. 6B, for example, the network device sends the first information in a paging manner. In addition, when the network device sends the first information in the paging manner, the network device may send the first information in DCI (scrambled by the first RNTI) used to schedule a PDSCH, or may send the first information in the DCI. S62 and S63 are described subsequently by using an example in which the network device sends the first information in the DCI. S64 and S65 are described by using an example in which the network device sends the first information in the PDSCH. It may be understood that S62 and S63, and S64 and S65 are two optional implementations, and the network device may select one of the two implementations. A specific implementation to be selected may be determined by the network device and notified to the terminal device, or may be specified in a protocol.

S62: The network device includes the first information in the DCI, scrambles, by using the first RNTI, a PDCCH carrying the DCI, and sends the PDCCH at a paging occasion, where the first information is used to indicate whether to release or disable the one or more uplink resources. The first terminal device monitors the PDCCH at the paging occasion.

S63: The first terminal device obtains the first information from the DCI carried on the received PDCCH. After receiving the PDCCH, the first terminal device determines that the PDCCH is scrambled by the first RNTI, and may obtain the first information from the DCI.

S64: The network device sends the PDCCH at a paging occasion, where the DCI carried on the PDCCH includes scheduling information used to schedule a PDSCH, and the first terminal device receives the PDCCH at the paging occasion, to obtain the DCI carried on the PDCCH.

S65: The network device sends the PDSCH based on the scheduling information, where the PDSCH includes the first information, and the first terminal device receives the PDSCH from the network device, to obtain the first information included in the PDSCH. After receiving the PDCCH, the first terminal device determines that the PDCCH is scrambled by the first RNTI, and may obtain the first information from the PDSCH.

S66: If the first terminal device determines, based on the first information included in a system message, that the first uplink resource needs to be released or disabled, the first terminal device releases or disables the first uplink resource. In addition. S67 is further included: If the first terminal device releases or disables the first uplink resource, the first terminal device may not send the uplink data, or may send the uplink data in a manner such as random access or EDT.

As a solution parallel with S66. S68 is as follows: If the first terminal device determines, based on the first information included in a system message, that the first uplink resource neither needs to be released nor needs to be disabled, the first terminal device sends the uplink data by using the first uplink resource.

S69: The first terminal device monitors the PDCCH.

S70: After receiving the uplink data, the network device sends the terminal device RRC signaling, for example, referred to as second RRC signaling, and the terminal device receives the second RRC signaling from the network device.

For S69 and S70, refer to descriptions of S12 to S14 in the embodiment shown in FIG. 1.

In this embodiment of this application, uplink resources used by the terminal device to send uplink data in idle mode may be allocated to the terminal device, so that the terminal device may send the uplink data in idle mode by using the allocated uplink resources. Compared with uplink data sent in an EDT manner, an amount of uplink data that can be sent by using these uplink resources may be relatively large, so that a data transmission requirement of the terminal device in RRC idle mode is met. In addition, for example, when network load is relatively heavy, the network device may determine to release or disable at least one uplink resource. In this case, the network device may broadcast first information, and indicate, by using the first information, to release or disable the at least one uplink resource. Therefore, after receiving the first information, the terminal device may determine to release or disable a corresponding uplink resource according to an indication of the first information, so that the network device performs other scheduling on the uplink resource. It can be learned that, according to the technical solution provided in the embodiments of this application, the network device may implement relatively flexible management on the uplink resources that are configured for the terminal device and that are used for transmission by the terminal device in idle mode, so that the network device may also schedule the uplink resources when needing to schedule uplink resources. In this way, reasonableness of resource management by the network device is improved, flexibility of resource scheduling by the network device is improved, normal communication process covered by the network device can be ensured as much as possible, a probability of a problem such as a service transmission failure or congestion is reduced, and resource utilization is also improved.

The following describes, with reference to the accompanying drawings, apparatuses configured to implement the foregoing methods in the embodiments of this application. Therefore, all the foregoing content may be used in the following embodiments, and repeated content is not described again.

Figure 7:
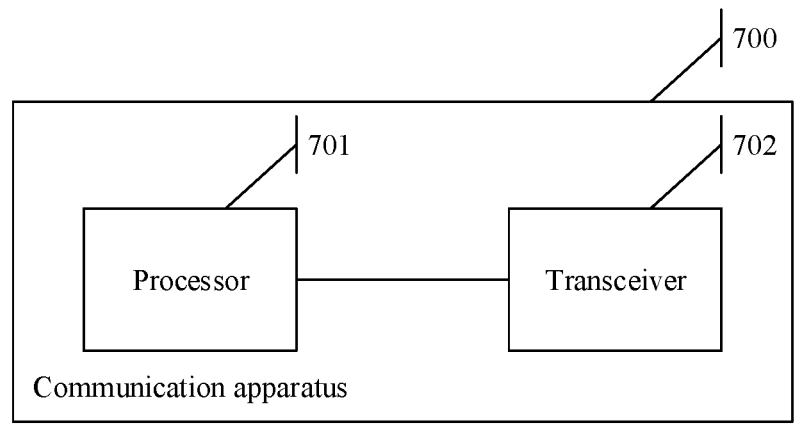
FIG. 7 is a schematic diagram of a communication apparatus that can implement a function of a network device according to an embodiment of this application.

An embodiment of this application provides a first type of communication apparatus. For example, the communication apparatus is a first communication apparatus. Refer to FIG. 7. For example, the communication apparatus is a communication apparatus 700. The communication apparatus 700 may implement functions of the network device in the foregoing descriptions. The communication apparatus 700 may be the network device in the foregoing descriptions, or may be a chip disposed in the network device in the foregoing descriptions. The communication apparatus 700 may include a processor 701 and a transceiver 702. The processor 701 may be configured to perform S32 in the embodiment shown in FIG. 3, and/or configured to support another process of the technology described in this specification. The transceiver 702 may be configured to perform S31 and S33 in the embodiment shown in FIG. 3, and/or configured to support another process of the technology described in this specification.

For example, the processor 701 is configured to determine to release or disable one or more uplink resources, where the uplink resources are used to receive uplink data from a terminal device in idle mode.

The transceiver 702 is configured to send first information, where the first information is used to indicate to release or disable a part or all of the one or more uplink resources.

In a possible implementation, the one or more uplink resources include all uplink resources that are configured by the network device and that are used by the terminal device to perform uplink transmission in idle mode.

In a possible implementation,
the first information includes at least one first index, used to indicate to release an uplink resource that is corresponding to the at least one first index and that is in the one or more uplink resources; or
the first information includes a first condition, used to indicate to release an uplink resource that meets the first condition and that is in the one or more uplink resources.

In a possible implementation,
the first information includes at least one second index, used to indicate to disable an uplink resource that is corresponding to the at least one second index and that is in the one or more uplink resources; or
the first information includes a second condition, used to indicate to disable an uplink resource that meets the second condition and that is in the one or more uplink resources.

In a possible implementation, the transceiver 702 is further configured to:
send second information to a first terminal device, where the second information is used to configure a first uplink resource for the first terminal device, the second information is further used to configure a first index and/or a second index for the first uplink resource, the first index is used to indicate whether to release the first uplink resource, and the second index is used to indicate whether to disable the first uplink resource.

In a possible implementation, the transceiver 702 is configured to send the first information in the following manner:
- sending a system message, where the system message includes the first information, and the system message is a SIB and/or a MIB; or
- sending the first information in a paging manner.

In a possible implementation, the transceiver 702 is configured to send the first information in a paging manner in the following manner:
- sending, at a paging occasion, DCI used to schedule a paging message, where the DCI includes the first information; or
- after sending, at a paging occasion, DCI used to schedule a paging message, sending the paging message, where the paging message includes the first information.

In a possible implementation, the transceiver 702 is configured to send the first information in a paging manner in the following manner:
- sending, at a paging occasion, DCI scrambled by a first RNTI, where the DCI includes the first information, and the first RNTI is not a P-RNTI; or
- after sending, at a paging occasion, DCI scrambled by a first RNTI, sending a PDSCH scheduled by the DCI, where the PDSCH includes the first information, and the first RNTI is not a P-RNTI.

All related content of the steps in the foregoing method embodiments may be cited in function descriptions of a corresponding functional module, and details are not described herein again.

Figure 8:
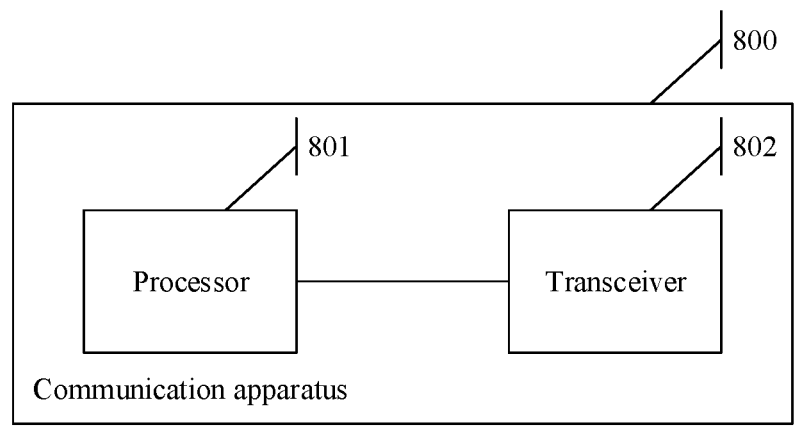
FIG. 8 is a schematic diagram of a communication apparatus that can implement a function of a terminal device according to an embodiment of this application.

An embodiment of this application provides a second type of communication apparatus. For example, the communication apparatus is a second communication apparatus. Refer to FIG. 8. For example, the communication apparatus is a communication apparatus 800. The communication apparatus 800 may implement functions of the first terminal device in the foregoing descriptions. The communication apparatus 800 may be the first terminal device in the foregoing descriptions, or may be a chip disposed in the first terminal device in the foregoing descriptions. The communication apparatus 800 may include a processor 801 and a transceiver 802. The processor 801 may be configured to perform S34 in the embodiment shown in FIG. 3, and/or configured to support another process of the technology described in this specification. The transceiver 802 may be configured to perform S31 and S33 in the embodiment shown in FIG. 3, and/or configured to support another process of the technology described in this specification.

For example, the transceiver 802 is configured to receive second information from a network device, where the second information is used to configure a first uplink resource for the first terminal device, and the first uplink resource is used by the first terminal device in idle mode to send uplink data to the network device.

The transceiver 802 is further configured to receive first information from the network device.

The processor 801 is configured to determine, according to an indication of the first information, whether to release or disable the first uplink resource.

In a possible implementation, the second information is further used to configure a first index and/or a second index for the first uplink resource, the first index is used to indicate whether to release the first uplink resource, and the second index is used to indicate whether to disable the first uplink resource.

In a possible implementation, the first information is used to indicate to release or disable all uplink resources that are configured by the network device and that are used by the terminal device to perform uplink transmission in idle mode.

In a possible implementation, the processor 801 is configured to determine, according to the indication of the first information and in the following manner, whether to release the first uplink resource:
- if the first information includes at least one first index, when determining that the first index corresponding to the first uplink resource belongs to the at least one first index, determining to release the first uplink resource; and when determining that the first index corresponding to the first uplink resource does not belong to the at least one first index, determining not to release the first uplink resource; or
- if the first information includes a first condition, when determining that the first uplink resource meets the first condition, determining to release the first uplink resource; and when determining that the first uplink resource does not meet the first condition, determining not to release the first uplink resource.

In a possible implementation, the processor 801 is configured to determine, according to the indication of the first information and in the following manner, whether to disable the first uplink resource;
- if the first information includes at least one second index, when determining that the second index corresponding to the first uplink resource belongs to the at least one second index, determining to disable the first uplink resource; and when determining that the second index corresponding to the first uplink resource does not belong to the at least one second index, determining not to disable the first uplink resource; or
- if the first information includes a second condition, when determining that the first uplink resource meets the second condition, determining to disable the first uplink resource; and when determining that the first uplink resource does not meet the second condition, determining not to disable the first uplink resource.

In a possible implementation, the transceiver 802 is configured to receive the first information from the network device in the following manner:
- when the first terminal device has to-be-sent uplink data, receiving a broadcast message from the network device, where the broadcast message includes the first information; or
- receiving the first information in a paging manner.

In a possible implementation, the transceiver 802 is configured to receive the first information in a paging manner in the following manner:
- receiving, at a paging occasion, DCI used to schedule a paging message, where the DCI includes the first information; or
- after receiving, at a paging occasion, DCI used to schedule a paging message, receiving the paging message, where the paging message includes the first information.

In a possible implementation, the transceiver 802 is configured to receive the first information in a paging manner in the following manner:
- receiving, at a paging occasion, DCI scrambled by a first RNTI, where the DCI includes the first information, and the first RNTI is not a P-RNTI; or after receiving, at a paging occasion, DCI scrambled by a first RNTI, receiving a PDSCH scheduled by the DCI, where the PDSCH includes the first information, and the first RNTI is not a P-RNTI.

In a possible implementation, the broadcast message is a SIB and/or a MIB.

In a possible implementation, the processor 801 is further configured to:

release or disable the first uplink resource according to an indication of the first information, to avoid sending the uplink data by using the first uplink resource; or skip releasing or disabling the first uplink resource according to an indication of the first information, and send the uplink data by using the first uplink resource by using the transceiver 802.

All related content of the steps in the foregoing method embodiments may be cited in function descriptions of a corresponding functional module, and details are not described herein again.

Figure 9A:
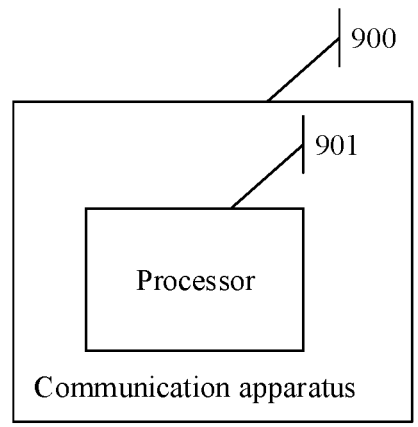
FIG. 9A and FIG. 9B are two schematic structural diagrams of a communication apparatus according to an embodiment of this application.

In a simple embodiment, a person skilled in the art can figure out that the foregoing several types of communication apparatuses may alternatively be implemented by using a structure of a communication apparatus 900 shown in FIG. 9A. The communication apparatus 900 may implement functions of the terminal device or network device in the foregoing descriptions. The communication apparatus 900 may include a processor 901.

When the communication apparatus 900 is configured to implement the functions of the first terminal device in the foregoing descriptions, the processor 901 may be configured to perform S34 in the embodiment shown in FIG. 3, and/or configured to support another process of the technology described in this specification. Alternatively, when the communication apparatus 900 is configured to implement the functions of the network device in the foregoing descriptions, the processor 901 may be configured to perform S32 in the embodiment shown in FIG. 3, and/or configured to support another process of the technology described in this specification.

The communication apparatus 900 may be implemented by a field-programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip. The communication apparatus 900 may be disposed in the first terminal device or network device in the embodiments of this application, so that the first terminal device or the network device implements the method provided in the embodiments of this application.

In an optional implementation, the communication apparatus 900 may include a transceiver component, configured to communicate with another device. When the communication apparatus 900 is configured to implement the functions of the first terminal device or network device in the foregoing descriptions, the transceiver component may be configured to perform S31 and S33 in the embodiment shown in FIG. 3, and/or configured to support another process of the technology described in this specification.

Figure 9B:
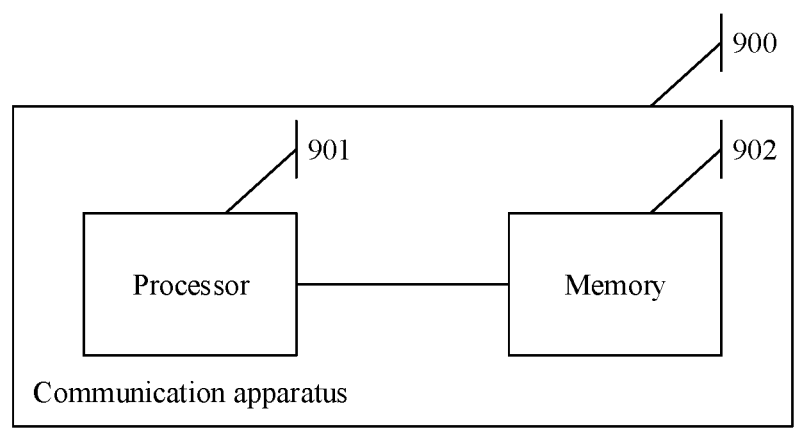

In an optional implementation, the communication apparatus 900 may further include a memory 902. Refer to FIG. 9B. The memory 902 is configured to store computer programs or instructions, and the processor 901 is configured to decode and execute these computer programs or instructions. It should be understood that these computer programs or instructions may include a function program of the foregoing first terminal device or network device. When function programs of the first terminal device are decoded and executed by the processor 901, the first terminal device is enabled to implement the functions of the first terminal device in the method provided in the embodiment shown in FIG. 3 in the embodiments of this application. When the function programs of the network device are decoded and executed by the processor 901, the network device is enabled to implement a function of the network device in the method provided in the embodiment shown in FIG. 3 in the embodiments of this application.

In another optional implementation, the function programs of the first terminal device or network device are stored in an external memory of the communication apparatus 900. When the function programs of the first terminal device are decoded and executed by the processor 901, the memory 902 temporarily stores a part or all of content of the function programs of the first terminal device. When the function programs of the network device are decoded and executed by the processor 901, the memory 902 temporarily stores a part or all of content of the function programs of the network device.

In another optional implementation, the function programs of the first terminal device or network device are set and stored in the internal memory 902 of the communication apparatus 900. When the internal memory 902 of the communication apparatus 900 stores the function programs of the first terminal device, the communication apparatus 900 may be disposed in the first terminal device in the embodiments of this application. When the internal memory 902 of the communication apparatus 900 stores the function programs of the network device, the communication apparatus 900 may be disposed in the network device in the embodiments of this application.

In still another optional implementation, a part of content of the function programs of the first terminal device is stored in an external memory of the communication apparatus 900, and the other part of the content of the function programs of the first terminal device is stored in an internal memory 902 of the communication apparatus 900. Alternatively, a part of content of the function programs of the network device is stored in an external memory of the communication apparatus 900, and the other part of the content of the function programs of the network device is stored in an internal memory 902 of the communication apparatus 900.

In the embodiments of this application, the communication apparatus 700, the communication apparatus 800, and the communication apparatus 900 are presented in a form in which each functional module is divided for each function, or may be presented in a form in which each functional module is divided in an integrated manner. The "module" herein may be an ASIC, a processor and a memory that execute one or more software or firmware programs, an integrated logic circuit, and/or another component that can provide the foregoing functions.

In addition, the first type of communication apparatus in the foregoing descriptions may alternatively be implemented in another form. For example, the communication apparatus includes a processing module and a transceiver module. For example, the processing module may be implemented by using the processor 701, and the transceiver module may be implemented by using the transceiver 702. The processing module may be configured to perform S32 in the embodiment shown in FIG. 3, and/or configured to support another process of the technology described in this specification. The transceiver module may be configured to perform S31 and S33 in the embodiment shown in FIG. 3, and/or configured to support another process of the technology described in this specification.

For example, the processing module is configured to determine to release or disable one or more uplink resources, where the uplink resources are used to receive uplink data from a terminal device in idle mode.

The transceiver module is configured to send first information, where the first information is used to indicate to release or disable a part or all of the one or more uplink resources.

In a possible implementation, the one or more uplink resources include all uplink resources that are configured by the network device and that are used by the terminal device to perform uplink transmission in idle mode.

In a possible implementation,
the first information includes at least one first index, used to indicate to release an uplink resource that is corresponding to the at least one first index and that is in the one or more uplink resources; or
the first information includes a first condition, used to indicate to release an uplink resource that meets the first condition and that is in the one or more uplink resources.

In a possible implementation,
the first information includes at least one second index, used to indicate to disable an uplink resource that is corresponding to the at least one second index and that is in the one or more uplink resources; or
the first information includes a second condition, used to indicate to disable an uplink resource that meets the second condition and that is in the one or more uplink resources.

In a possible implementation, the transceiver module is further configured to:
send second information to a first terminal device, where the second information is used to configure a first uplink resource for the first terminal device, the second information is further used to configure a first index and/or a second index for the first uplink resource, the first index is used to indicate whether to release the first uplink resource, and the second index is used to indicate whether to disable the first uplink resource.

In a possible implementation, the transceiver module is configured to send the first information in the following manner:
sending a system message, where the system message includes the first information, and the system message is a SIB and/or a MIB; or
sending the first information in a paging manner.

In a possible implementation, the transceiver module is configured to send the first information in a paging manner in the following manner:
sending, at a paging occasion, DCI used to schedule a paging message, where the DCI includes the first information; or
after sending, at a paging occasion, DCI used to schedule a paging message, sending the paging message, where the paging message includes the first information.

In a possible implementation, the transceiver module is configured to send the first information in a paging manner in the following manner:
sending, at a paging occasion, DCI scrambled by a first RNTI, where the DCI includes the first information, and the first RNTI is not a P-RNTI; or
after sending, at a paging occasion, DCI scrambled by a first RNTI, sending a PDSCH scheduled by the DCI, where the PDSCH includes the first information, and the first RNTI is not a P-RNTI.

All related content of the steps in the foregoing method embodiments may be cited in function descriptions of a corresponding functional module, and details are not described herein again.

The second type of communication apparatus in the foregoing descriptions may alternatively be implemented in another form. For example, the communication apparatus includes a processing module and a transceiver module. For example, the processing module may be implemented by using the processor 801, and the transceiver module may be implemented by using the transceiver 802. The processing module may be configured to perform S34 in the embodiment shown in FIG. 3, and/or configured to support another process of the technology described in this specification. The transceiver module may be configured to perform S32 in the embodiment shown in FIG. 3, and/or configured to support another process of the technology described in this specification.

For example, the transceiver module is configured to receive second information from a network device, where the second information is used to configure a first uplink resource for the first terminal device, and the first uplink resource is used by the first terminal device in idle mode to send uplink data to the network device.

The transceiver module is further configured to receive first information from the network device.

The processing module is configured to determine, according to an indication of the first information, whether to release or disable the first uplink resource.

In a possible implementation, the second information is further used to configure a first index and/or a second index for the first uplink resource, the first index is used to indicate whether to release the first uplink resource, and the second index is used to indicate whether to disable the first uplink resource.

In a possible implementation, the first information is used to indicate to release or disable all uplink resources that are configured by the network device and that are used by the terminal device to perform uplink transmission in idle mode.

In a possible implementation, the processing module is configured to determine, according to the indication of the first information and in the following manner, whether to release the first uplink resource:
if the first information includes at least one first index, when determining that the first index corresponding to the first uplink resource belongs to the at least one first index, determining to release the first uplink resource; and when determining that the first index corresponding to the first uplink resource does not belong to the at least one first index, determining not to release the first uplink resource; or
if the first information includes a first condition, when determining that the first uplink resource meets the first condition, determining to release the first uplink resource; and when determining that the first uplink resource does not meet the first condition, determining not to release the first uplink resource.

In a possible implementation, the processing module is configured to determine, according to the indication of the first information and in the following manner, whether to disable the first uplink resource:
if the first information includes at least one second index, when determining that the second index corresponding to the first uplink resource belongs to the at least one second index, determining to disable the first uplink resource; and when determining that the second index corresponding to the first uplink resource does not belong to the at least one second index, determining not to disable the first uplink resource; or if the first information includes a second condition, when determining that the first uplink resource meets the second condition, determining to disable the first uplink resource; and when determining that the first uplink resource does not meet the second condition, determining not to disable the first uplink resource.

In a possible implementation, the transceiver module is configured to receive the first information from the network device in the following manner:

when the first terminal device has to-be-sent uplink data, receiving a broadcast message from the network device, where the broadcast message includes the first information; or receiving the first information in a paging manner.

In a possible implementation, the transceiver module is configured to receive the first information in a paging manner in the following manner:

receiving, at a paging occasion, DCI used to schedule a paging message, where the DCI includes the first information; or after receiving, at a paging occasion, DCI used to schedule a paging message, receiving the paging message, where the paging message includes the first information.

In a possible implementation, the transceiver module is configured to receive the first information in a paging manner in the following manner:

receiving, at a paging occasion, DCI scrambled by a first RNTI, where the DCI includes the first information, and the first RNTI is not a P-RNTI; or after receiving, at a paging occasion, DCI scrambled by a first RNTI, receiving a PDSCH scheduled by the DCI, where the PDSCH includes the first information, and the first RNTI is not a P-RNTI.

In a possible implementation, the broadcast message is a SIB and/or a MIB.

In a possible implementation, the processing module is further configured to:

release or disable the first uplink resource according to an indication of the first information, to avoid sending the uplink data by using the first uplink resource; or skip releasing or disabling the first uplink resource according to an indication of the first information, and send the uplink data by using the first uplink resource by using the transceiver module.

All related content of the steps in the foregoing method embodiments may be cited in function descriptions of a corresponding functional module, and details are not described herein again.

The communication apparatus 700, the communication apparatus 800, and the communication apparatus 900 provided in the embodiments of this application may be configured to perform the method provided in the embodiment shown in FIG. 3. Therefore, for technical effects that can be achieved by the communication apparatuses, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

It is clear that a person skilled in the art can make various modifications and variations to the embodiments of this application without departing from the scope of this application. In this case, this application is intended to cover these modifications and variations in the embodiments of this application, provided that they fall within the scope of the following claims and their equivalent technologies.

What is claimed is:

1. A resource management method, comprising:
 determining, by a network device, to release or disable one or more configured uplink resources, wherein the one or more configured uplink resources are used to receive uplink data from a terminal device in an idle mode; and
 sending, by the network device, first information, wherein the first information is used to indicate to release or disable a part or all of the one or more configured uplink resources, wherein the first information comprises a first condition, used to enable the terminal device to determine whether to release or disable a configured uplink resource that satisfies the first condition and that is in the one or more configured uplink resources.

2. The method according to claim 1, wherein the one or more configured uplink resources comprise uplink resources that are configured by the network device and that are used by the terminal device to perform uplink transmission in the idle mode.

3. The method according to claim 1, wherein the sending, by the network device, first information comprises:
sending, by the network device, a system information block (SIB), wherein the SIB comprises the first information.

4. A resource management method, comprising:
receiving, by a first terminal device, second information from a network device, wherein the second information is used to configure a first uplink resource for the first terminal device, and the first uplink resource is used by the first terminal device in an idle mode to send uplink data to the network device; and thereafter
receiving, by the first terminal device, first information from the network device, wherein the first information comprises a first condition; and
determining, by the first terminal device according to the first condition, whether to release or disable the first uplink resource, wherein the determining includes:
based on the first terminal device determining that the first uplink resource meets the first condition, determining, by the first terminal device, to release the first uplink resource; or
based on the first terminal device determining that the first uplink resource does not meet the first condition, determining, by the first terminal device, not to release the first uplink resource.

5. The method according to claim 4, wherein the first information is used to indicate to release or disable all uplink resources that are configured by the network device and that are used by the terminal device to perform uplink transmission in the idle mode.

6. The method according to claim 4, wherein the receiving, by the first terminal device, first information from the network device comprises:
when the first terminal device has to-be-sent uplink data, receiving, by the first terminal device, a broadcast message from the network device, wherein the broadcast message comprises the first information.

7. The method according to claim 6, wherein the broadcast message is a system information block (SIB).

8. A communication apparatus, comprising:
a processor; and
a computer readable storage medium storing programming for execution by the processor, the programming including instructions to carry out steps comprising:
determining to release or disable one or more configured uplink resources, wherein the one or more configured uplink resources are used to receive uplink data from a terminal device in an idle mode; and
sending first information, wherein the first information is used to indicate to release or disable a part or all of the one or more configured uplink resources, wherein the first information comprises a first condition, used to enable the terminal device to determine whether to release or disable a configured uplink resource that satisfies the first condition and that is in the one or more configured uplink resources.

9. The communication apparatus according to claim 8, wherein the one or more configured uplink resources comprise uplink resources that are configured by the communication apparatus and that are used by the terminal device to perform uplink transmission in an idle mode.

10. The communication apparatus according to claim 8, wherein the steps further comprise:
sending a system information block (SIB), wherein the SIB comprises the first information.

11. A communication apparatus, comprising:
a processor; and
a computer readable storage medium storing programming for execution by the processor, the programming including instructions to carry out steps comprising:
receiving second information from a network device, wherein the second information is used to configure a first uplink resource for the communication apparatus, and the first uplink resource is used by the communication apparatus in an idle mode to send uplink data to the network device; and thereafter
receiving first information from the network device, wherein the first information comprises a first condition; and
determining according to the first condition, whether to release or disable the first uplink resource, wherein the determining includes:
based on determining that the first uplink resource meets the first condition, determining to release the first uplink resource; or
based on determining that the first uplink resource does not meet the first condition, determining not to release the first uplink resource.

12. The communication apparatus according to claim 11, wherein the first information is used to indicate to release or disable uplink resources that are configured by the network device and that are used by the communication apparatus to perform uplink transmission in the idle mode.

13. The communication apparatus according to claim 11, wherein the steps further comprise:
when the communication apparatus has to-be-sent uplink data, receiving a broadcast message from the network device, wherein the broadcast message comprises the first information.

14. The communication apparatus according to claim 13, wherein the broadcast message is a system information block (SIB).

* * * * *